United States Patent
Mehanna et al.

(10) Patent No.: US 9,053,175 B2
(45) Date of Patent: Jun. 9, 2015

(54) INTELLIGENT RESULTS USING A SPELLING CORRECTION AGENT

(71) Applicant: Facebook, Inc., Menlo Park, CA (US)

(72) Inventors: Lara Mehanna, Arlington, VA (US); Shawkat Hasan, Dulles, VA (US); Harmannus Vandermolen, Dulles, VA (US); Gerald Campbell, Ashburn, VA (US)

(73) Assignee: FACEBOOK, INC., Menlo Park, CA (US)

( * ) Notice: Subject to any disclaimer, the term of this patent is extended or adjusted under 35 U.S.C. 154(b) by 339 days.

(21) Appl. No.: 13/754,458

(22) Filed: Jan. 30, 2013

(65) Prior Publication Data

US 2013/0151546 A1 Jun. 13, 2013

Related U.S. Application Data

(63) Continuation of application No. 13/734,738, filed on Jan. 4, 2013, now Pat. No. 8,954,534, which is a continuation of application No. 13/184,414, filed on Jul. 15, 2011, now Pat. No. 8,452,849, which is a (Continued)

(51) Int. Cl.
*G06F 15/16* (2006.01)
*G06F 17/30* (2006.01)
*H04L 29/06* (2006.01)

(52) U.S. Cl.
CPC ...... *G06F 17/3064* (2013.01); *G06F 17/30867* (2013.01); *G06F 17/30554* (2013.01); *G06F 17/30864* (2013.01); *G06F 17/30442* (2013.01); *G06F 17/3053* (2013.01); *G06F 17/30477* (2013.01); *H04L 29/06027* (2013.01); *G06F 17/30483* (2013.01)

(58) Field of Classification Search
None
See application file for complete search history.

(56) References Cited

U.S. PATENT DOCUMENTS

| | | |
|---|---|---|
| 4,650,927 A | 3/1987 | James |
| 4,817,129 A | 3/1989 | Riskin |
| 4,837,798 A | 6/1989 | Cohen et al. |
| 5,008,853 A | 4/1991 | Bly et al. |
| 5,021,949 A | 6/1991 | Morten et al. |
| 5,025,252 A | 6/1991 | DeLuca et al. |

(Continued)

FOREIGN PATENT DOCUMENTS

| | | |
|---|---|---|
| CA | 2547240 | 12/2009 |
| CA | 2506417 | 6/2011 |

(Continued)

OTHER PUBLICATIONS

U.S. Appl. No. 10/715,213, filed Dec. 6, 2013, Notice of Allowance.

(Continued)

*Primary Examiner* — Jeffrey R Swearingen
(74) *Attorney, Agent, or Firm* — Keller Jolley Preece

(57) ABSTRACT

Information may be presented to a user by using a first application to receive a character stream of one or more noncompletion characters. The noncompletion characters indicate that additional characters may be received. The character stream is exchanged with a host that analyzes the character stream to generate results that are responsive to the user's predicted interest. Results are received and displayed so that the user may select one of the results to launch a code segment related to the selected result.

20 Claims, 10 Drawing Sheets

Related U.S. Application Data continuation of application No. 10/651,303, filed on Aug. 29, 2003, now Pat. No. 8,005,919.

(60) Provisional application No. 60/426,806, filed on Nov. 18, 2002, provisional application No. 60/427,944, filed on Nov. 21, 2002, provisional application No. 60/471,337, filed on May 19, 2003, provisional application No. 60/471,338, filed on May 19, 2003, provisional application No. 60/488,400, filed on Jul. 21, 2003.

(56) References Cited

U.S. PATENT DOCUMENTS

| | | |
|---|---|---|
| 5,086,394 A | 2/1992 | Shapira |
| 5,101,424 A | 3/1992 | Clayto et al. |
| 5,276,905 A | 1/1994 | Hurst et al. |
| 5,315,636 A | 5/1994 | Patel |
| 5,329,619 A | 7/1994 | Page et al. |
| 5,351,235 A | 9/1994 | Lahtinen |
| 5,425,028 A | 6/1995 | Bitton et al. |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,557,320 A | 9/1996 | Krebs |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,579,472 A | 11/1996 | Keyworth, II et al. |
| 5,590,133 A | 12/1996 | Bilstrom et al. |
| 5,592,538 A | 1/1997 | Kosowsky et al. |
| 5,604,788 A | 2/1997 | Tett |
| 5,608,786 A | 3/1997 | Gordon |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,706,211 A | 1/1998 | Beletic et al. |
| 5,706,501 A | 1/1998 | Horikiri |
| 5,710,884 A | 1/1998 | Dedrick |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis et al. |
| 5,760,771 A | 6/1998 | Blonder et al. |
| 5,761,196 A | 6/1998 | Ayerst et al. |
| 5,764,916 A | 6/1998 | Busey et al. |
| 5,771,280 A | 6/1998 | Johnson et al. |
| 5,774,673 A | 6/1998 | Beuk |
| 5,793,365 A | 8/1998 | Tang et al. |
| 5,793,762 A | 8/1998 | Penners et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,812,865 A | 9/1998 | Theimer et al. |
| 5,819,084 A | 10/1998 | Shapiro et al. |
| 5,826,025 A | 10/1998 | Gramlich |
| 5,835,089 A | 11/1998 | Skarbo et al. |
| 5,835,722 A | 11/1998 | Bradshaw et al. |
| 5,835,905 A | 11/1998 | Pirolli et al. |
| 5,845,073 A | 12/1998 | Carlin et al. |
| 5,845,300 A | 12/1998 | Comer et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,878,233 A | 3/1999 | Schloss |
| 5,878,397 A | 3/1999 | Stille et al. |
| 5,895,454 A | 4/1999 | Harrington |
| 5,896,321 A | 4/1999 | Miller et al. |
| 5,897,635 A | 4/1999 | Torres et al. |
| 5,903,726 A | 5/1999 | Donovan et al. |
| 5,913,032 A | 6/1999 | Schwartz et al. |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack |
| 5,946,617 A | 8/1999 | Portaro et al. |
| 5,946,629 A | 8/1999 | Sawyer et al. |
| 5,946,630 A | 8/1999 | Willars et al. |
| 5,950,193 A | 9/1999 | Kulkarni |
| 5,960,074 A | 9/1999 | Clark |
| 5,960,173 A | 9/1999 | Tang et al. |
| 5,960,429 A | 9/1999 | Peercy et al. |
| 5,961,620 A | 10/1999 | Trent et al. |
| 5,966,663 A | 10/1999 | Gleason |
| 5,970,122 A | 10/1999 | LaPorta et al. |
| 5,974,446 A | 10/1999 | Sonnenreich et al. |
| 5,978,673 A | 11/1999 | Alperovich et al. |
| 5,987,113 A | 11/1999 | James |
| 5,987,376 A | 11/1999 | Olson et al. |
| 5,999,932 A | 12/1999 | Paul |
| 6,006,331 A | 12/1999 | Chu et al. |
| 6,014,429 A | 1/2000 | LaPorta et al. |
| 6,020,884 A | 2/2000 | MacNaughton et al. |
| 6,026,429 A | 2/2000 | Jones et al. |
| 6,028,866 A | 2/2000 | Engel |
| 6,038,451 A | 3/2000 | Syed et al. |
| 6,041,311 A | 3/2000 | Chislenko et al. |
| 6,049,533 A | 4/2000 | Norman et al. |
| 6,064,723 A | 5/2000 | Cohen et al. |
| 6,065,047 A | 5/2000 | Carpenter et al. |
| 6,065,056 A | 5/2000 | Bradshaw et al. |
| 6,067,529 A | 5/2000 | Ray et al. |
| 6,067,561 A | 5/2000 | Dillon |
| 6,073,109 A | 6/2000 | Flores |
| 6,073,138 A | 6/2000 | de l'Etraz |
| 6,076,100 A | 6/2000 | Cottrille et al. |
| 6,081,829 A | 6/2000 | Sidana |
| 6,081,830 A | 6/2000 | Schindler |
| 6,088,435 A | 7/2000 | Barber |
| 6,091,948 A | 7/2000 | Carr et al. |
| 6,091,958 A | 7/2000 | Bergkvist et al. |
| 6,092,049 A | 7/2000 | Chislenko et al. |
| 6,112,078 A | 8/2000 | Sormunen et al. |
| 6,112,181 A | 8/2000 | Shear |
| 6,115,455 A | 9/2000 | Picard |
| 6,115,605 A | 9/2000 | Siccardo et al. |
| 6,119,014 A | 9/2000 | Alperovich et al. |
| 6,128,739 A | 10/2000 | Fleming, III |
| 6,134,432 A | 10/2000 | Holmes et al. |
| 6,134,582 A | 10/2000 | Kennedy |
| 6,138,146 A | 10/2000 | Moon et al. |
| 6,138,158 A | 10/2000 | Boyle et al. |
| 6,141,545 A | 10/2000 | Begeja et al. |
| 6,144,959 A | 11/2000 | Anderson |
| 6,148,328 A | 11/2000 | Cuomo et al. |
| 6,148,377 A | 11/2000 | Carter |

(56) References Cited

U.S. PATENT DOCUMENTS

| | | |
|---|---|---|
| 6,157,618 A | 12/2000 | Boss et al. |
| 6,161,129 A | 12/2000 | Rochkind |
| 6,161,130 A | 12/2000 | Horvitz et al. |
| 6,167,256 A | 12/2000 | Yla-Outinen |
| 6,169,911 B1 | 1/2001 | Wagner et al. |
| 6,175,831 B1 | 1/2001 | Weinreich et al. |
| 6,175,859 B1 | 1/2001 | Mohler |
| 6,178,331 B1 | 1/2001 | Holmes et al. |
| 6,185,603 B1 | 2/2001 | Henderson et al. |
| 6,189,026 B1 | 2/2001 | Birrell et al. |
| 6,192,396 B1 | 2/2001 | Kohler |
| 6,195,354 B1 | 2/2001 | Skalecki et al. |
| 6,198,738 B1 | 3/2001 | Chang et al. |
| 6,199,099 B1 | 3/2001 | Gershman et al. |
| 6,199,103 B1 | 3/2001 | Sakaguchi et al. |
| 6,208,996 B1 | 3/2001 | Ben-Shachar et al. |
| 6,212,175 B1 | 4/2001 | Harsch |
| 6,212,548 B1 | 4/2001 | DeSimone et al. |
| 6,212,550 B1 | 4/2001 | Segur |
| 6,223,177 B1 | 4/2001 | Tatham |
| 6,237,027 B1 | 5/2001 | Namekawa |
| 6,237,092 B1 | 5/2001 | Hayes, Jr. |
| 6,243,039 B1 | 6/2001 | Elliot |
| 6,243,714 B1 | 6/2001 | Shapiro et al. |
| 6,247,043 B1 | 6/2001 | Bates et al. |
| 6,252,952 B1 | 6/2001 | Kung et al. |
| 6,256,516 B1 | 7/2001 | Wagner et al. |
| 6,259,911 B1 | 7/2001 | Bims et al. |
| 6,260,148 B1 | 7/2001 | Aggarwal et al. |
| 6,269,369 B1 | 7/2001 | Robertson |
| 6,282,435 B1 | 8/2001 | Wagner et al. |
| 6,292,743 B1 | 9/2001 | Pu et al. |
| 6,301,609 B1 | 10/2001 | Aravamudan et al. |
| 6,304,864 B1 | 10/2001 | Liddy et al. |
| 6,311,211 B1 | 10/2001 | Shaw |
| 6,324,541 B1 | 11/2001 | de l'Etraz et al. |
| 6,327,590 B1 | 12/2001 | Chidlovski et al. |
| 6,330,590 B1 | 12/2001 | Cotten |
| 6,334,111 B1 | 12/2001 | Carrott |
| 6,337,712 B1 | 1/2002 | Shiota et al. |
| 6,343,317 B1 | 1/2002 | Glorikian |
| 6,347,332 B1 | 2/2002 | Malet |
| 6,349,299 B1 | 2/2002 | Spencer et al. |
| 6,351,777 B1 | 2/2002 | Simonoff |
| 6,360,251 B1 | 3/2002 | Fujita et al. |
| 6,363,248 B1 | 3/2002 | Silverman |
| 6,366,907 B1 | 4/2002 | Fanning |
| 6,374,246 B1 | 4/2002 | Matsuo |
| 6,374,260 B1 | 4/2002 | Hoffert et al. |
| 6,374,290 B1 | 4/2002 | Scharber |
| 6,389,127 B1 | 5/2002 | Vardi et al. |
| 6,389,372 B1 | 5/2002 | Glance et al. |
| 6,392,669 B1 | 5/2002 | Matoba et al. |
| 6,393,464 B1 | 5/2002 | Dieterman |
| 6,393,465 B2 | 5/2002 | Leeds |
| 6,396,512 B1 | 5/2002 | Nickerson |
| 6,404,438 B1 | 6/2002 | Hatleid |
| 6,405,035 B1 | 6/2002 | Singh |
| 6,415,318 B1 | 7/2002 | Aggarwal et al. |
| 6,421,439 B1 | 7/2002 | Liffick |
| 6,421,675 B1 | 7/2002 | Ryan |
| 6,421,709 B1 | 7/2002 | McCormick et al. |
| 6,423,012 B1 | 7/2002 | Kato et al. |
| 6,425,012 B1 | 7/2002 | Trovato et al. |
| 6,430,602 B1 | 8/2002 | Kay et al. |
| 6,430,604 B1 | 8/2002 | Ogle et al. |
| 6,434,599 B1 | 8/2002 | Porter |
| 6,442,589 B1 | 8/2002 | Takahashi et al. |
| 6,442,591 B1 | 8/2002 | Haynes et al. |
| 6,446,119 B1 | 9/2002 | Olah et al. |
| 6,449,344 B1 | 9/2002 | Goldfinger et al. |
| 6,449,634 B1 | 9/2002 | Capiel |
| 6,457,044 B1 | 9/2002 | Iwazaki |
| 6,457,062 B1 | 9/2002 | Pivowar |
| 6,460,073 B1 | 10/2002 | Asakura |
| 6,463,464 B1 | 10/2002 | Lazaridis et al. |
| 6,463,471 B1 | 10/2002 | Dreke et al. |
| 6,466,918 B1 | 10/2002 | Spiegel et al. |
| 6,480,885 B1 | 11/2002 | Olivier |
| 6,483,913 B1 | 11/2002 | Smith |
| 6,484,196 B1 | 11/2002 | Maurille |
| 6,487,583 B1 | 11/2002 | Harvey et al. |
| 6,487,584 B1 | 11/2002 | Bunney |
| 6,493,703 B1 | 12/2002 | Knight et al. |
| 6,499,053 B1 | 12/2002 | Marquette |
| 6,505,167 B1 | 1/2003 | Horvitz et al. |
| 6,507,866 B1 | 1/2003 | Barchi |
| 6,512,570 B2 | 1/2003 | Garfinkle et al. |
| 6,512,930 B2 | 1/2003 | Sandegren |
| 6,519,629 B2 | 2/2003 | Harvey et al. |
| 6,519,639 B1 | 2/2003 | Glasser et al. |
| 6,519,648 B1 | 2/2003 | Eyal |
| 6,529,903 B2 | 3/2003 | Smith et al. |
| 6,535,228 B1 | 3/2003 | Bandaru et al. |
| 6,535,586 B1 | 3/2003 | Cloutier et al. |
| 6,539,421 B1 | 3/2003 | Appelman et al. |
| 6,542,500 B1 | 4/2003 | Gerzberg et al. |
| 6,549,933 B1 | 4/2003 | Barrett et al. |
| 6,549,937 B1 | 4/2003 | Auerbach et al. |
| 6,557,027 B1 | 4/2003 | Cragun |
| 6,564,213 B1 | 5/2003 | Ortega et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,567,807 B1 | 5/2003 | Robles |
| 6,571,234 B1 | 5/2003 | Knight et al. |
| 6,583,799 B1 | 6/2003 | Manolis et al. |
| 6,584,494 B1 | 6/2003 | Manabe et al. |
| 6,594,673 B1 | 7/2003 | Smith et al. |
| 6,604,133 B2 | 8/2003 | Aggarwal et al. |
| 6,606,647 B2 | 8/2003 | Shah et al. |
| 6,606,657 B1 | 8/2003 | Zilberstein et al. |
| 6,611,822 B1 | 8/2003 | Beams |
| 6,615,237 B1 | 9/2003 | Kyne et al. |
| 6,615,241 B1 | 9/2003 | Miller et al. |
| 6,618,747 B1 | 9/2003 | Flynn et al. |
| 6,625,423 B1 | 9/2003 | Wang |
| 6,628,194 B1 | 9/2003 | Hellebust et al. |
| 6,633,630 B1 | 10/2003 | Owens et al. |
| 6,636,733 B1 | 10/2003 | Helferich |
| 6,636,850 B2 | 10/2003 | Lepien |
| 6,636,888 B1 | 10/2003 | Bookspan et al. |
| 6,640,218 B1 | 10/2003 | Golding |
| 6,640,223 B1 | 10/2003 | Jones et al. |
| 6,643,641 B1 | 11/2003 | Snyder |
| 6,643,669 B1 | 11/2003 | Novak et al. |
| 6,647,259 B1 | 11/2003 | Boyle et al. |
| 6,647,383 B1 | 11/2003 | August et al. |
| 6,654,800 B1 | 11/2003 | Rieger, III |
| 6,658,095 B1 | 12/2003 | Yoakum et al. |
| 6,658,260 B2 | 12/2003 | Knotts |
| 6,665,676 B2 | 12/2003 | Twig et al. |
| 6,665,715 B1 | 12/2003 | Houri |
| 6,677,968 B1 | 1/2004 | Appelman |
| 6,678,719 B1 | 1/2004 | Stimmel |
| 6,684,240 B1 | 1/2004 | Goddard |
| 6,687,362 B1 | 2/2004 | Lindquist et al. |
| 6,687,739 B2 | 2/2004 | Anupam |
| 6,687,745 B1 | 2/2004 | Franco et al. |
| 6,691,162 B1 | 2/2004 | Wick |
| 6,694,353 B2 | 2/2004 | Sommerer |
| 6,697,807 B2 | 2/2004 | McGeachie |
| 6,697,824 B1 | 2/2004 | Bowman-Amuah |
| 6,697,840 B1 | 2/2004 | Godefroid |
| 6,699,125 B2 | 3/2004 | Kirmse et al. |
| 6,701,343 B1 | 3/2004 | Kenyon |
| 6,701,348 B1 | 3/2004 | Sommerer |
| 6,701,351 B1 | 3/2004 | Gann |
| 6,704,727 B1 | 3/2004 | Kravets |
| 6,708,205 B2 | 3/2004 | Sheldon et al. |
| 6,711,565 B1 | 3/2004 | Subramaniam et al. |
| 6,714,519 B2 | 3/2004 | Luzzatti et al. |
| 6,714,791 B2 | 3/2004 | Friedman |
| 6,714,793 B1 | 3/2004 | Carey et al. |

(56) References Cited

U.S. PATENT DOCUMENTS

| | | |
|---|---|---|
| 6,721,784 B1 | 4/2004 | Leonard et al. |
| 6,728,357 B2 | 4/2004 | O'Neal et al. |
| 6,731,308 B1 | 5/2004 | Tang et al. |
| 6,732,103 B1 | 5/2004 | Strick et al. |
| 6,732,155 B2 | 5/2004 | Meek |
| 6,732,185 B1 | 5/2004 | Reistad |
| 6,750,881 B1 | 6/2004 | Appelman |
| 6,751,603 B1 | 6/2004 | Bauer et al. |
| 6,754,904 B1 | 6/2004 | Cooper et al. |
| 6,757,365 B1 | 6/2004 | Bogard |
| 6,757,531 B1 | 6/2004 | Haaramo |
| 6,760,412 B1 | 7/2004 | Loucks |
| 6,760,580 B2 | 7/2004 | Robinson et al. |
| 6,760,753 B1 | 7/2004 | Ohgushi et al. |
| 6,760,754 B1 | 7/2004 | Isaacs et al. |
| 6,772,188 B1 | 8/2004 | Cloutier |
| 6,781,608 B1 | 8/2004 | Crawford |
| 6,782,414 B1 | 8/2004 | Xue et al. |
| 6,785,554 B1 | 8/2004 | Amerga |
| 6,788,769 B1 | 9/2004 | Waites |
| 6,799,039 B2 | 9/2004 | Wu et al. |
| 6,800,031 B2 | 10/2004 | Di Cesare |
| 6,801,659 B1 | 10/2004 | O'Dell |
| 6,807,562 B1 | 10/2004 | Pennock et al. |
| 6,816,884 B1 | 11/2004 | Summers |
| 6,829,607 B1 | 12/2004 | Tafoya et al. |
| 6,832,245 B1 | 12/2004 | Isaacs et al. |
| 6,839,554 B2 | 1/2005 | McDowell |
| 6,839,735 B2 | 1/2005 | Wong et al. |
| 6,839,737 B1 | 1/2005 | Friskel |
| 6,848,008 B1 | 1/2005 | Sevanto et al. |
| 6,848,542 B2 | 2/2005 | Gailey et al. |
| 6,853,982 B2 | 2/2005 | Smith et al. |
| 6,854,007 B1 | 2/2005 | Hammond |
| 6,856,999 B2 | 2/2005 | Flanagin et al. |
| 6,868,498 B1 | 3/2005 | Katsikas |
| 6,895,426 B1 | 5/2005 | Cortright et al. |
| 6,898,626 B2 | 5/2005 | Ohashi |
| 6,901,398 B1 | 5/2005 | Horvitz et al. |
| 6,901,559 B1 | 5/2005 | Blum |
| 6,904,026 B1 | 6/2005 | Tarnanen et al. |
| 6,907,243 B1 | 6/2005 | Patel |
| 6,912,505 B2 | 6/2005 | Linden et al. |
| 6,912,563 B1 | 6/2005 | Parker et al. |
| 6,912,564 B1 | 6/2005 | Appelman et al. |
| 6,917,813 B2 | 7/2005 | Elizondo |
| 6,917,965 B2 | 7/2005 | Gupta et al. |
| 6,920,478 B2 | 7/2005 | Mendiola et al. |
| 6,925,469 B2 | 8/2005 | Headings et al. |
| 6,931,419 B1 | 8/2005 | Lindquist |
| 6,934,367 B1 | 8/2005 | LaPierre et al. |
| 6,952,805 B1 | 10/2005 | Tafoya et al. |
| 6,957,077 B2 | 10/2005 | Dehlin |
| 6,985,943 B2 | 1/2006 | Deryugin et al. |
| 6,990,628 B1 | 1/2006 | Palmer et al. |
| 6,993,325 B1 | 1/2006 | Waesterlid |
| 6,999,566 B1 | 2/2006 | Eason et al. |
| 6,999,959 B1 | 2/2006 | Lawrence et al. |
| 7,003,551 B2 | 2/2006 | Malik |
| 7,003,794 B2 | 2/2006 | Arye |
| 7,007,008 B2 | 2/2006 | Goel et al. |
| 7,007,228 B1 | 2/2006 | Carro |
| 7,010,312 B1 | 3/2006 | Zechlin |
| 7,016,978 B2 | 3/2006 | Malik et al. |
| 7,020,849 B1 | 3/2006 | Chen |
| 7,031,961 B2 | 4/2006 | Pitkow et al. |
| 7,032,007 B2 | 4/2006 | Fellenstein et al. |
| 7,035,865 B2 | 4/2006 | Doss et al. |
| 7,035,926 B1 | 4/2006 | Cohen et al. |
| 7,039,639 B2 | 5/2006 | Brezin et al. |
| 7,054,918 B2 | 5/2006 | Poleyn |
| 7,058,036 B1 | 6/2006 | Yu et al. |
| 7,058,690 B2 | 6/2006 | Maehiro |
| 7,058,892 B1 | 6/2006 | MacNaughton et al. |
| 7,062,533 B2 | 6/2006 | Brown et al. |
| 7,065,186 B1 | 6/2006 | Myers et al. |
| 7,068,769 B1 | 6/2006 | Weaver et al. |
| 7,076,504 B1 | 7/2006 | Handel |
| 7,076,546 B1 | 7/2006 | Bates et al. |
| 7,080,139 B1 | 7/2006 | Briggs et al. |
| 7,082,407 B1 | 7/2006 | Bezos et al. |
| 7,089,237 B2 | 8/2006 | Turnbull et al. |
| 7,089,287 B2 | 8/2006 | Bellotti et al. |
| 7,092,952 B1 | 8/2006 | Wilens |
| 7,092,998 B2 | 8/2006 | Frietas |
| 7,096,009 B2 | 8/2006 | Mousseau et al. |
| 7,096,030 B2 | 8/2006 | Huomo |
| 7,096,214 B1 | 8/2006 | Bharat et al. |
| 7,113,803 B2 | 9/2006 | Dehlin |
| 7,117,254 B2 | 10/2006 | Lunt et al. |
| 7,124,123 B1 | 10/2006 | Roskind et al. |
| 7,127,232 B2 | 10/2006 | O'Neil et al. |
| 7,130,956 B2 | 10/2006 | Rao |
| 7,133,506 B1 | 11/2006 | Smith |
| 7,133,898 B1 | 11/2006 | Malik |
| 7,136,903 B1 | 11/2006 | Phillips |
| 7,139,806 B2 | 11/2006 | Hayes et al. |
| 7,142,642 B2 | 11/2006 | McClelland et al. |
| 7,146,404 B2 | 12/2006 | Kay et al. |
| 7,146,416 B1 | 12/2006 | Yoo et al. |
| 7,162,528 B1 | 1/2007 | Simonoff |
| 7,177,880 B2 | 2/2007 | Ruvolo |
| 7,181,498 B2 | 2/2007 | Zhu et al. |
| 7,185,059 B2 | 2/2007 | Daniell et al. |
| 7,188,143 B2 | 3/2007 | Szeto |
| 7,188,153 B2 | 3/2007 | Lunt et al. |
| 7,190,956 B2 | 3/2007 | Dorenbosch et al. |
| 7,194,516 B2 | 3/2007 | Giacobbe et al. |
| 7,200,634 B2 | 4/2007 | Mendiola et al. |
| 7,203,507 B2 | 4/2007 | Smith et al. |
| 7,206,814 B2 | 4/2007 | Kirsch |
| 7,212,617 B2 | 5/2007 | Owens et al. |
| 7,218,921 B2 | 5/2007 | Mendiola et al. |
| 7,222,309 B2 | 5/2007 | Chupin et al. |
| 7,231,428 B2 | 6/2007 | Teague |
| 7,231,478 B2 | 6/2007 | Leijten |
| 7,237,002 B1 | 6/2007 | Estrada |
| 7,237,011 B1 | 6/2007 | St. Pierre |
| 7,240,093 B1 | 7/2007 | Danieli et al. |
| 7,246,371 B2 | 7/2007 | Diacakis et al. |
| 7,257,639 B1 | 8/2007 | Li et al. |
| 7,269,590 B2 | 9/2007 | Hull et al. |
| 7,269,627 B2 | 9/2007 | Knauerhase |
| 7,275,215 B2 | 9/2007 | Werndorfer et al. |
| 7,297,110 B2 | 11/2007 | Goyal et al. |
| 7,299,257 B2 | 11/2007 | Boyer et al. |
| 7,305,624 B1 | 12/2007 | Siegel |
| 7,313,760 B2 | 12/2007 | Grossman |
| 7,319,882 B2 | 1/2008 | Mendiola et al. |
| 7,324,826 B2 | 1/2008 | Carey et al. |
| 7,337,219 B1 | 2/2008 | Meenan et al. |
| 7,370,035 B2 | 5/2008 | Gross et al. |
| 7,383,339 B1 | 6/2008 | Meenan et al. |
| 7,401,098 B2 | 7/2008 | Baker |
| 7,403,942 B1 | 7/2008 | Bayliss |
| 7,406,715 B2 | 7/2008 | Clapper |
| 7,411,939 B1 | 8/2008 | Lamb et al. |
| 7,424,510 B2 | 9/2008 | Gross et al. |
| 7,428,580 B2 | 9/2008 | Hullfish et al. |
| 7,428,585 B1 | 9/2008 | Owens et al. |
| 7,475,113 B2 | 1/2009 | Stolze |
| 7,478,414 B1 | 1/2009 | Glusker et al. |
| 7,499,973 B2 | 3/2009 | Couts et al. |
| 7,512,407 B2 | 3/2009 | Wu et al. |
| 7,543,243 B2 | 6/2009 | Schwartz et al. |
| 7,552,460 B2 | 6/2009 | Goldman |
| 7,590,696 B1 | 9/2009 | Odell |
| 7,603,417 B2 | 10/2009 | Ben-Yoseph |
| 7,613,776 B1 | 11/2009 | Ben-Yoseph |
| 7,640,306 B2 | 12/2009 | Appelman et al. |
| 7,653,693 B2 | 1/2010 | Heikes |
| 7,675,903 B2 | 3/2010 | Ozugur et al. |
| 7,680,796 B2 | 3/2010 | Yeh et al. |
| 7,686,693 B2 | 3/2010 | Danieli et al. |

(56) References Cited

U.S. PATENT DOCUMENTS

| | | |
|---|---|---|
| 7,716,287 B2 | 5/2010 | Appelman et al. |
| 7,725,541 B2 | 5/2010 | Daniell et al. |
| 7,725,542 B2 | 5/2010 | Daniell et al. |
| 7,752,273 B2 | 7/2010 | Ito et al. |
| 7,774,410 B2 | 8/2010 | Gang |
| 7,774,711 B2 | 8/2010 | Valeski |
| 7,899,862 B2 | 3/2011 | Appelman et al. |
| 7,908,327 B2 | 3/2011 | Kucharewski |
| 8,001,199 B2 | 8/2011 | Appelman |
| 8,005,919 B2 | 8/2011 | Mehanna |
| 8,055,675 B2 | 11/2011 | Higgins et al. |
| 8,117,265 B2 | 2/2012 | Ben-Yoseph |
| 8,122,137 B2 | 2/2012 | Appelman et al. |
| 8,150,922 B2 | 4/2012 | Griffin et al. |
| 8,156,193 B1 | 4/2012 | Odell |
| 8,167,712 B2 | 5/2012 | Sarkar et al. |
| 8,224,916 B2 | 7/2012 | Kucharewski |
| 8,452,849 B2 | 5/2013 | Mehanna |
| 8,577,972 B1 | 11/2013 | Heikes |
| 2001/0002469 A1 | 5/2001 | Bates et al. |
| 2001/0003202 A1 | 6/2001 | Mache et al. |
| 2001/0003203 A1 | 6/2001 | Mache |
| 2001/0005861 A1 | 6/2001 | Mousseau et al. |
| 2001/0013050 A1 | 8/2001 | Shah |
| 2001/0013069 A1 | 8/2001 | Shah |
| 2001/0016823 A1 | 8/2001 | Richards et al. |
| 2001/0018858 A1 | 9/2001 | Dwek |
| 2001/0025280 A1 | 9/2001 | Mandato et al. |
| 2001/0034224 A1 | 10/2001 | McDowell et al. |
| 2001/0048735 A1 | 12/2001 | O'Neal |
| 2001/0056363 A1 | 12/2001 | Gantz et al. |
| 2002/0002586 A1 | 1/2002 | Rafal et al. |
| 2002/0006803 A1 | 1/2002 | Mendiola et al. |
| 2002/0007398 A1 | 1/2002 | Mendiola et al. |
| 2002/0016818 A1 | 2/2002 | Kirani et al. |
| 2002/0021307 A1 | 2/2002 | Glenn et al. |
| 2002/0023132 A1 | 2/2002 | Tornabene et al. |
| 2002/0023147 A1 | 2/2002 | Kovacs et al. |
| 2002/0029224 A1 | 3/2002 | Carlsson |
| 2002/0032729 A1 | 3/2002 | Erickson et al. |
| 2002/0032742 A1 | 3/2002 | Anderson |
| 2002/0035605 A1 | 3/2002 | McDowell et al. |
| 2002/0042830 A1 | 4/2002 | Bose et al. |
| 2002/0046243 A1 | 4/2002 | Morris |
| 2002/0049610 A1 | 4/2002 | Gropper |
| 2002/0049704 A1 | 4/2002 | Vanderveldt et al. |
| 2002/0049751 A1 | 4/2002 | Chen et al. |
| 2002/0049806 A1 | 4/2002 | Gatz et al. |
| 2002/0049847 A1 | 4/2002 | McArdle et al. |
| 2002/0049852 A1 | 4/2002 | Lee et al. |
| 2002/0052921 A1 | 5/2002 | Morkel |
| 2002/0054092 A1 | 5/2002 | Hedloy |
| 2002/0059379 A1 | 5/2002 | Harvey et al. |
| 2002/0059401 A1 | 5/2002 | Austin |
| 2002/0059425 A1 | 5/2002 | Belfore et al. |
| 2002/0059526 A1 | 5/2002 | Dillon et al. |
| 2002/0065828 A1 | 5/2002 | Goodspeed |
| 2002/0065856 A1 | 5/2002 | Kisiel |
| 2002/0065894 A1 | 5/2002 | Dalal et al. |
| 2002/0066036 A1 | 5/2002 | Makineni et al. |
| 2002/0071539 A1 | 6/2002 | Diament et al. |
| 2002/0078077 A1 | 6/2002 | Baumann et al. |
| 2002/0083127 A1 | 6/2002 | Agrawal |
| 2002/0083136 A1 | 6/2002 | Whitten, II |
| 2002/0084888 A1 | 7/2002 | Jin |
| 2002/0087630 A1 | 7/2002 | Wu |
| 2002/0087649 A1 | 7/2002 | Horvitz |
| 2002/0087704 A1 | 7/2002 | Chesnais et al. |
| 2002/0091667 A1 | 7/2002 | Jaipuria et al. |
| 2002/0091936 A1 | 7/2002 | Tema |
| 2002/0095464 A1 | 7/2002 | Meek |
| 2002/0095663 A1 | 7/2002 | Joory |
| 2002/0097856 A1 | 7/2002 | Wullert, II |
| 2002/0103801 A1 | 8/2002 | Lyons |
| 2002/0112181 A1 | 8/2002 | Smith |
| 2002/0112239 A1 | 8/2002 | Goldman |
| 2002/0116461 A1 | 8/2002 | Diacakis et al. |
| 2002/0116463 A1 | 8/2002 | Hart |
| 2002/0116528 A1 | 8/2002 | Vale |
| 2002/0116641 A1 | 8/2002 | Mastrianni |
| 2002/0118809 A1 | 8/2002 | Eisenberg |
| 2002/0119789 A1 | 8/2002 | Friedman |
| 2002/0120687 A1 | 8/2002 | Diacakis et al. |
| 2002/0120697 A1 | 8/2002 | Generous et al. |
| 2002/0120779 A1 | 8/2002 | Teeple et al. |
| 2002/0123328 A1 | 9/2002 | Snip et al. |
| 2002/0123988 A1 | 9/2002 | Dean et al. |
| 2002/0128047 A1 | 9/2002 | Gates |
| 2002/0130904 A1 | 9/2002 | Becker et al. |
| 2002/0133369 A1 | 9/2002 | Johnson |
| 2002/0136390 A1 | 9/2002 | Lang et al. |
| 2002/0137530 A1 | 9/2002 | Karve |
| 2002/0138650 A1 | 9/2002 | Yamamoto et al. |
| 2002/0143565 A1 | 10/2002 | Headings et al. |
| 2002/0144283 A1 | 10/2002 | Headings et al. |
| 2002/0151294 A1 | 10/2002 | Kirby et al. |
| 2002/0154178 A1 | 10/2002 | Barnett |
| 2002/0155826 A1 | 10/2002 | Robinson et al. |
| 2002/0160757 A1 | 10/2002 | Shavit et al. |
| 2002/0160805 A1 | 10/2002 | Laitinen et al. |
| 2002/0165000 A1 | 11/2002 | Fok |
| 2002/0165729 A1 | 11/2002 | Kuebert et al. |
| 2002/0169748 A1 | 11/2002 | Macholda |
| 2002/0174050 A1 | 11/2002 | Enyard |
| 2002/0174260 A1 | 11/2002 | Huang |
| 2002/0175953 A1 | 11/2002 | Lin |
| 2002/0178072 A1 | 11/2002 | Gusler et al. |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0184128 A1 | 12/2002 | Holtsinger |
| 2002/0184309 A1 | 12/2002 | Danker et al. |
| 2002/0187794 A1 | 12/2002 | Fostick et al. |
| 2002/0188620 A1 | 12/2002 | Doss et al. |
| 2002/0194378 A1 | 12/2002 | Foti |
| 2002/0199095 A1 | 12/2002 | Bandini et al. |
| 2003/0004855 A1 | 1/2003 | Dutta |
| 2003/0004872 A1 | 1/2003 | Gardi et al. |
| 2003/0006912 A1 | 1/2003 | Brescia |
| 2003/0009385 A1 | 1/2003 | Tucciarone et al. |
| 2003/0009698 A1 | 1/2003 | Lindeman et al. |
| 2003/0014485 A1 | 1/2003 | Banatwala |
| 2003/0018704 A1 | 1/2003 | Polychronidis et al. |
| 2003/0018726 A1 | 1/2003 | Low et al. |
| 2003/0018747 A1 | 1/2003 | Herland et al. |
| 2003/0023681 A1 | 1/2003 | Brown et al. |
| 2003/0023684 A1 | 1/2003 | Brown et al. |
| 2003/0023692 A1 | 1/2003 | Moroo |
| 2003/0023875 A1 | 1/2003 | Hursey |
| 2003/0025824 A1 | 2/2003 | Ishikawa |
| 2003/0028524 A1 | 2/2003 | Keskar |
| 2003/0028595 A1 | 2/2003 | Vogt et al. |
| 2003/0028597 A1 | 2/2003 | Salmi |
| 2003/0028884 A1 | 2/2003 | Swart et al. |
| 2003/0037112 A1 | 2/2003 | Fitzpatrick et al. |
| 2003/0037114 A1 | 2/2003 | Nishio et al. |
| 2003/0042306 A1 | 3/2003 | Irwin |
| 2003/0045272 A1 | 3/2003 | Burr |
| 2003/0046097 A1 | 3/2003 | LaSalle et al. |
| 2003/0050916 A1 | 3/2003 | Ortega |
| 2003/0050976 A1 | 3/2003 | Block |
| 2003/0051161 A1 | 3/2003 | Smith et al. |
| 2003/0052915 A1 | 3/2003 | Brown et al. |
| 2003/0054830 A1 | 3/2003 | Williams et al. |
| 2003/0055831 A1 | 3/2003 | Ryan |
| 2003/0055897 A1 | 3/2003 | Brown et al. |
| 2003/0058478 A1 | 3/2003 | Aoki |
| 2003/0060211 A1 | 3/2003 | Chern |
| 2003/0064422 A1 | 4/2003 | McDevitt |
| 2003/0065721 A1 | 4/2003 | Roskind |
| 2003/0078981 A1 | 4/2003 | Harms et al. |
| 2003/0078987 A1 | 4/2003 | Serebrennikov et al. |
| 2003/0079024 A1 | 4/2003 | Hough et al. |
| 2003/0081001 A1 | 5/2003 | Munro |

(56) References Cited

U.S. PATENT DOCUMENTS

| | | |
|---|---|---|
| 2003/0083046 A1 | 5/2003 | Mathis |
| 2003/0087632 A1 | 5/2003 | Sagi et al. |
| 2003/0088554 A1 | 5/2003 | Ryan |
| 2003/0101226 A1 | 5/2003 | Quine |
| 2003/0101343 A1 | 5/2003 | Eaton et al. |
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer |
| 2003/0110212 A1 | 6/2003 | Lewis |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131061 A1 | 7/2003 | Newton |
| 2003/0131143 A1 | 7/2003 | Myers |
| 2003/0135659 A1 | 7/2003 | Bellotti et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0185232 A1 | 10/2003 | Moore et al. |
| 2003/0187813 A1 | 10/2003 | Goldman |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0196967 A1 | 10/2003 | Robinson et al. |
| 2003/0197729 A1 | 10/2003 | Denoue et al. |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212745 A1 | 11/2003 | Caughey |
| 2003/0217109 A1 | 11/2003 | Ordille et al. |
| 2003/0220946 A1 | 11/2003 | Malik |
| 2003/0220976 A1 | 11/2003 | Malik |
| 2003/0222902 A1 | 12/2003 | Chupin et al. |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2004/0001480 A1 | 1/2004 | Tanigawa et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0010808 A1 | 1/2004 | deCarmo |
| 2004/0017396 A1 | 1/2004 | Werndorfer et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1 | 2/2004 | Creswell et al. |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0059708 A1 | 3/2004 | Dean et al. |
| 2004/0059781 A1 | 3/2004 | Yoakum et al. |
| 2004/0059942 A1 | 3/2004 | Xie |
| 2004/0064586 A1 | 4/2004 | Weigand |
| 2004/0073643 A1 | 4/2004 | Hayes et al. |
| 2004/0078440 A1 | 4/2004 | Potter et al. |
| 2004/0078445 A1 | 4/2004 | Malik |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0098491 A1 | 5/2004 | Costa-Requena et al. |
| 2004/0103156 A1 | 5/2004 | Quillen et al. |
| 2004/0107119 A1 | 6/2004 | Ohishi |
| 2004/0111261 A1 | 6/2004 | Chaudhari et al. |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo |
| 2004/0122730 A1 | 6/2004 | Tucciarone et al. |
| 2004/0122810 A1 | 6/2004 | Mayer |
| 2004/0122855 A1 | 6/2004 | Ruvolo |
| 2004/0122901 A1 | 6/2004 | Sylvain |
| 2004/0133564 A1 | 7/2004 | Gross et al. |
| 2004/0137882 A1 | 7/2004 | Forsyth |
| 2004/0141599 A1 | 7/2004 | Tang et al. |
| 2004/0143564 A1 | 7/2004 | Gross et al. |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0154022 A1 | 8/2004 | Boss et al. |
| 2004/0157586 A1 | 8/2004 | Robinson et al. |
| 2004/0162830 A1 | 8/2004 | Shirwadkar et al. |
| 2004/0171396 A1 | 9/2004 | Carey et al. |
| 2004/0172396 A1 | 9/2004 | Vanska |
| 2004/0176076 A1 | 9/2004 | Uppuluri |
| 2004/0176081 A1 | 9/2004 | Bryham et al. |
| 2004/0177119 A1 | 9/2004 | Mason et al. |
| 2004/0179039 A1 | 9/2004 | Blatter et al. |
| 2004/0186738 A1 | 9/2004 | Reisman |
| 2004/0186887 A1 | 9/2004 | Galli et al. |
| 2004/0186989 A1 | 9/2004 | Clapper |
| 2004/0193684 A1 | 9/2004 | Ben-Yoseph |
| 2004/0193722 A1 | 9/2004 | Donovan |
| 2004/0196315 A1 | 10/2004 | Swearigen et al. |
| 2004/0198351 A1 | 10/2004 | Knotts |
| 2004/0199581 A1 | 10/2004 | Kucharewski et al. |
| 2004/0199582 A1 | 10/2004 | Kucharewski et al. |

(56) References Cited

U.S. PATENT DOCUMENTS

| | | |
|---|---|---|
| 2004/0201624 A1 | 10/2004 | Crawford |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0267604 A1 | 12/2004 | Gross et al. |
| 2005/0004978 A1 | 1/2005 | Reed et al. |
| 2005/0004984 A1 | 1/2005 | Simpson |
| 2005/0004995 A1 | 1/2005 | Stochosky |
| 2005/0009541 A1 | 1/2005 | Ye et al. |
| 2005/0015432 A1 | 1/2005 | Cohen |
| 2005/0021750 A1 | 1/2005 | Abrams |
| 2005/0021854 A1 | 1/2005 | Bjorkner |
| 2005/0027382 A1 | 2/2005 | Krimse et al. |
| 2005/0038856 A1 | 2/2005 | Krishnasamy |
| 2005/0050143 A1 | 3/2005 | Guster et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0066362 A1 | 3/2005 | Rambo |
| 2005/0071251 A1 | 3/2005 | Linden et al. |
| 2005/0076240 A1 | 4/2005 | Appleman |
| 2005/0076241 A1 | 4/2005 | Appleman |
| 2005/0086305 A1 | 4/2005 | Koch et al. |
| 2005/0091314 A1 | 4/2005 | Blagsvedt et al. |
| 2005/0096084 A1 | 5/2005 | Pohja et al. |
| 2005/0102202 A1 | 5/2005 | Linden et al. |
| 2005/0108329 A1 | 5/2005 | Weaver et al. |
| 2005/0108341 A1 | 5/2005 | Matthew et al. |
| 2005/0114229 A1 | 5/2005 | Ackley |
| 2005/0114783 A1 | 5/2005 | Szeto |
| 2005/0125559 A1 | 6/2005 | Mutha |
| 2005/0149606 A1 | 7/2005 | Lyle et al. |
| 2005/0160144 A1 | 7/2005 | Bhatia |
| 2005/0171955 A1 | 8/2005 | Hull et al. |
| 2005/0172001 A1 | 8/2005 | Zaner et al. |
| 2005/0177486 A1 | 8/2005 | Yeager |
| 2005/0181878 A1 | 8/2005 | Danieli et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brien |
| 2005/0208957 A1 | 9/2005 | Knotts |
| 2005/0216300 A1 | 9/2005 | Appelman et al. |
| 2005/0223075 A1 | 10/2005 | Swearigen et al. |
| 2005/0239550 A1 | 10/2005 | Hardisty et al. |
| 2005/0246420 A1 | 11/2005 | Little |
| 2005/0251515 A1 | 11/2005 | Reed |
| 2005/0289469 A1 | 12/2005 | Chandler et al. |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0168204 A1 | 7/2006 | Appelman et al. |
| 2006/0242583 A1 | 10/2006 | MacNaughton et al. |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0288077 A1 | 12/2006 | Chen et al. |
| 2007/0092072 A1 | 4/2007 | Jacobs |
| 2007/0112966 A1 | 5/2007 | Eftis et al. |
| 2007/0157098 A1 | 7/2007 | Chupin et al. |
| 2007/0185957 A1 | 8/2007 | Mandalia et al. |
| 2007/0250566 A1 | 10/2007 | Appelman |
| 2008/0008106 A1 | 1/2008 | Boberg et al. |
| 2008/0133417 A1 | 6/2008 | Robinson |
| 2008/0255989 A1 | 10/2008 | Altberg et al. |
| 2008/0288604 A1 | 11/2008 | Major et al. |
| 2009/0016499 A1 | 1/2009 | Hullfish |
| 2009/0043844 A1 | 2/2009 | Zimmet et al. |
| 2009/0070306 A1 | 3/2009 | Stroe |
| 2009/0070433 A1 | 3/2009 | Karstens |
| 2009/0299934 A1 | 12/2009 | Horvitz et al. |
| 2011/0167116 A1 | 7/2011 | Kucharewski |
| 2011/0179117 A1 | 7/2011 | Appelman |
| 2011/0282955 A1 | 11/2011 | Appelman |
| 2012/0011110 A1 | 1/2012 | Mehanna |
| 2012/0198012 A1 | 8/2012 | Odell |
| 2012/0233269 A1 | 9/2012 | Ben-Yoseph |
| 2013/0013686 A1 | 1/2013 | Kucharewski |
| 2013/0031638 A1 | 1/2013 | Appelman |
| 2013/0066990 A1 | 3/2013 | Ben-Yoseph |
| 2013/0066991 A1 | 3/2013 | Ben-Yoseph |
| 2013/0066992 A1 | 3/2013 | Ben-Yoseph |
| 2013/0067002 A1 | 3/2013 | Heikes |
| 2013/0067003 A1 | 3/2013 | Heikes |
| 2013/0072239 A1 | 3/2013 | Hullfish |
| 2013/0073580 A1 | 3/2013 | Mehanna |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0097254 A1 | 4/2013 | Appelman |
| 2013/0097255 A1 | 4/2013 | Appelman |
| 2013/0097256 A1 | 4/2013 | Appelman |
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0132376 A1 | 5/2013 | Mehanna |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0145040 A1 | 6/2013 | Mehanna |
| 2013/0159290 A1 | 6/2013 | Mehanna |
| 2013/0159420 A1 | 6/2013 | Appelman |
| 2013/0159439 A1 | 6/2013 | Appelman |
| 2013/0159440 A1 | 6/2013 | Appelman |
| 2013/0159441 A1 | 6/2013 | Appelman |
| 2013/0159442 A1 | 6/2013 | Appelman |
| 2013/0173722 A1 | 7/2013 | Kucharewski |
| 2013/0174060 A1 | 7/2013 | Odell |

FOREIGN PATENT DOCUMENTS

| | | |
|---|---|---|
| CN | 1348296 | 5/2002 |
| CN | 100476805 | 4/2009 |
| DE | 10048653 | 4/2002 |
| EP | 0889660 | 1/1999 |
| EP | 1011243 | 6/2000 |
| EP | 1054329 | 11/2000 |
| EP | 1071295 | 1/2001 |
| EP | 1091532 | 4/2001 |

(56) References Cited

FOREIGN PATENT DOCUMENTS

| | | |
|---|---|---|
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1565845 | 8/2008 |
| GB | 2328835 | 3/1999 |
| GB | 2357932 | 7/2001 |
| GB | 2368747 | 5/2002 |
| JP | 2004-86950 | 3/1992 |
| JP | 2008-123821 | 5/1996 |
| JP | 2009-247334 | 9/1997 |
| JP | 2011-161682 | 6/1999 |
| JP | 2011-328194 | 11/1999 |
| JP | 2000-148795 | 5/2000 |
| JP | 2000-222424 | 8/2000 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 97/34244 | 9/1997 |
| WO | WO 97/37303 | 10/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/47270 | 8/2000 |
| WO | WO 00/79396 | 12/2000 |
| WO | WO 01/06748 | 1/2001 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/80079 | 10/2001 |
| WO | WO 02/03216 | 1/2002 |
| WO | WO 02/19643 | 3/2002 |
| WO | WO 02/28046 | 4/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 2006/026908 | 3/2003 |
| WO | WO 2004/046875 | 6/2004 |
| WO | WO 2004/046949 | 6/2004 |
| WO | WO 2004/046970 | 6/2004 |
| WO | WO 2004/088943 | 10/2004 |
| WO | WO 2004/111812 | 12/2004 |
| WO | WO 2004/111871 | 12/2004 |
| WO | WO 2005/010709 | 2/2005 |
| WO | WO 2005/054991 | 6/2005 |
| WO | WO 2005/057329 | 6/2005 |
| WO | WO 2005/086723 | 9/2005 |
| WO | WO 2005/089286 | 9/2005 |
| WO | WO 2006/066092 | 6/2006 |
| WO | WO 2006/068955 | 6/2006 |

OTHER PUBLICATIONS

U.S. Appl. No. 13/372,371, filed Nov. 29, 2013, Office Action.
U.S. Appl. No. 13/614,640, filed Jan. 31, 2014, Office Action.
U.S. Appl. No. 13/614,781, filed Dec. 26, 2013, Offfice Action.
U.S. Appl. No. 13/620,851, filed Nov. 29, 2013, Office Action.
U.S. Appl. No. 13/620,853, filed Jan. 9, 2014, Office Action.
U.S. Appl. No. 13/620,856, filed Jan. 9, 2014, Office Action.
U.S. Appl. No. 13/361,141, filed Jan. 17, 2014, Office Action.
U.S. Appl. No. 13/731,124, filed Dec. 6, 2013, Office Action.
U.S. Appl. No. 13/755,990, filed Jan. 29, 2014, Office Action.
U.S. Appl. No. 13/766,781, filed Nov. 27, 2013, Office Action.
U.S. Appl. No. 13/766,785, filed Nov. 29, 2013, Office Action.
U.S. Appl. No. 13/766,786, filed Nov. 27, 2013, Office Action.
U.S. Appl. No. 13/372,371, filed Mar. 26, 2014, Office Action.
U.S. Appl. No. 13/507,429, filed Mar. 28, 2014, Office Action.
U.S. Appl. No. 13/617,350, filed Mar. 27, 2014, Office Action.
U.S. Appl. No. 13/619,009, filed Mar. 12, 2014, Notice of Allowance.
U.S. Appl. No. 13/619,036, filed Mar. 21, 2014, Office Action.
U.S. Appl. No. 13/729,318, filed Feb. 5, 2014, Office Action.
U.S. Appl. No. 13/766,775, filed Mar. 24, 2014, Office Action.
U.S. Appl. No. 11/023,652, filed Apr. 29, 2014, Office Action.
U.S. Appl. No. 13/189,972, filed Apr. 21, 2014, Office Action.
U.S. Appl. No. 13/442,226, filed Apr. 14, 2014, Office Action.
U.S. Appl. No. 13/614,640, filed Jun. 11, 2014, Notice of Allowance.
U.S. Appl. No. 13/614,781, filed Apr. 2, 2014, Office Action.
U.S. Appl. No. 13/617,270, filed Apr. 10, 2014, Office Action.
U.S. Appl. No. 13/617,330, filed Apr. 8, 2014, Office Action.
U.S. Appl. No. 13/619,009, filed Apr. 11, 2014, Notice of Allowance.
U.S. Appl. No. 13/619,054, filed Apr. 7, 2014, Office Action.
U.S. Appl. No. 13/620,851, filed Apr. 8, 2014, Office Action.
U.S. Appl. No. 13/755,990, filed May 16, 2014, Notice of Allowance.
U.S. Appl. No. 13/766,781, filed May 6, 2014, Office Action.
U.S. Appl. No. 13/766,785, filed May 14, 2014, Office Action.
U.S. Appl. No. 13/766,786, filed May 8, 2014, Office Action.
U.S. Appl. No. 13/766,779, filed Apr. 11, 2014, Office Action.
U.S. Appl. No. 13/614,617, filed Oct. 17, 2014, Notice of Allowance.
U.S. Appl. No. 13/614,674, filed Oct. 3, 2014, Notice of Allowance.
U.S. Appl. No. 13/734,738, filed Oct. 3, 2014, Notice of Allowance.
U.S. Appl. No. 13/734,738, filed Nov. 13, 2014, Notice of Allowance.
U.S. Appl. No. 10/715,213, filed Nov. 18, 2003, Schlegel.
U.S. Appl. No. 10/974,969, filed Oct. 28, 2004, Wick.
U.S. Appl. No. 11/023,652, filed Dec. 29, 2004, Odell.
U.S. Appl. No. 13/361,141, filed Jan. 30, 2012, Appelman et al.
U.S. Appl. No. 13/617,270, filed Sep. 14, 2012, Appelman.
U.S. Appl. No. 13/617,330, filed Sep. 14, 2012, Appelman.
U.S. Appl. No. 13/617,350, filed Sep. 14, 2012, Appelman.
U.S. Appl. No. 13/619,036, filed Sep. 14, 2012, Heikes.
U.S. Appl. No. 13/619,054, filed Sep. 14, 2012, Heikes.
U.S. Appl. No. 13/620,862, filed Sep. 15, 2012, Appelman et al.
U.S. Appl. No. 13/620,863, filed Sep. 15, 2012, Appelman et al.
U.S. Appl. No. 13/620,865, filed Sep. 15, 2012, Appelman et al.
Automated feature of Internet Explorer, www.geocities.com/technofundo/tech/web/ie_autocomplete.html, pp. 1-6, Feb. 18, 2004.
"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
AT Mobile Develops Networking-Sensing Instant Messaging, Dec. 8, 1999, Newsbytes, pp. 1-2.
"A Countermeasure to Duplicate-detecting Anti-spam Techniques," Robert J. Hall, AT&T Labs Technical Report 99.9.1, May 1999, Abst. and pp. 1-26.

(56) References Cited

OTHER PUBLICATIONS

Adeptra Services Overview; Nov. 7, 2002; adeptra.com ; pp. 1-7.
Adeptra, Features; Nov. 27, 2002; adeptra.com ; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http://www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.
Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Boyce, Jim, "Microsoft Office Outlook 2003 Inside Out," Microsoft Press (published Nov. 12, 2003), pp. 252.
Brugali, David, "Mediating the Internet," Annals of Software Engineering, vol. 13, pp. 285-308, Jun. 2002, Kluwer Academic Publishers, The Netherlands.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.
Chen, Hao et al. "Bringing Order to the Web: Automatically Categorizing Search Results." Proceedings of the SIGCHI conference on human factors in computing systems. ACM Press. pp. 145-152, New York, Jan. 2000.
Chung-Hwa Herman Rao et al.; iMobile: A Proxy-Based Platform for Mobile Services; Network Services Research Center AT&T Labs-Rsearch, Aug. 2001.
Chung-Hwa- Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
"Creating a Single List of Contacts—Google Scholar" available at http://scholar.google.com/scholar?hl=en&lr= &q=creating+a+single+list+list+of+contacts&as . . . (Mar. 27, 2007), 10 pages.
CommWorks 8250 Personal Communications Management System; Dec. 11, 2002; commworks.com; pp. 1-2.
CommWorks IP Messaging; Dec. 11, 2002; commworks.com; pp. 1-2.
ConNexus to awareness: extending awareness to mobile users, Tang, J.C. and Yankelovich, N. and Begole, J. and Van Kleek M. and Li, F. and Bhalodia J., Proceedings of the SIGCHI conference on Human factors in computing systems, pp. 221-228, Dec. 2001, ACM Press, New York, NY, USA.
"CrushParty.com: Help," retrieved Jun. 12, 2002 from the World Wide Web: http://www.crushparty.com/help.jsp, 3 pages.
CNET Networks Inc., "PopUp Killer", Sep. 13, 2001, Internet: download. cnet.com/downloads/O-10059-100-6932612 shtml, (3 pages).
Convergys Interactive Alerts Reduce Customer Care Costs and Improve Customer Satisfaction; convergys.com ; pp. 1-2, Jan. 22, 2002.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches.html (visited Feb. 13, 2003).
"Degrees of Separation Email Spam Protection", Halfbakery: Degrees of Separation Email Spam Protection, reprinted from http://halfbakery.com/idea/Degrees-20 of -20Separation-20Email-20Spam-20Protecti . . . printed on Mar. 1, 2004 (3 pages).
"Denied Database for KnockKnock," http://www.knockmail coml support/denydatabase.html, pp. 1, as accessed on Dec. 4, 2003.
"Email Server Control for KnockKnock," http://www.knockmail.com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 20-25, 2002, CHI, Minneapolis, Minnesota, vol. 4, Issue 1, pp. 447-454.
Global Solutions Directory; Nov. 7, 2002; softwaresibm.com ; pp. 1-5.
Google Zeitgeist—Search patterns, trends, and surprises according to Google, Jan. 2003, pp. 1-2, http://www.google.com/press/zeitgeist.html (visited Feb. 13, 2003).
G. Held, "Instant Messaging Finds its Voice", Network Magazine, May 2001, INSPEC p. 5.
G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Issacs, E. and Walendowski A.m and Ranganathan, D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know WhetherYou Sizzle or Fizzle, Marino, Jul. 11, 2001, Florida Times Union, p. C.1. (2 total pages).
Home-tribe.net, http://washingtondc stribe meUmessage/24434dlb-817b-4580 -aa42 -3bffal5f26a?page=1 , (4 pages), printed from Internet Dec. 13, 2004, message dated Oct. 19, 2003.
http://www.friendster.com , (17 pages), Dec. 2004.
http://www.knockrnail.com/support/newsettings.jpg, as accessed on Dec. 4. 2003.
"Icq.anywhere, Email Features-Email Center-ICQ.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.
Ipipi Frequently Asked Questions; Nov. 6, 2002; ipipi.com ; pp. 1-2.
Ignite Software: Parent Tools Feature Set, "Parent Tools Features," http://www.parent-tools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/allpublic . . . , (visted Jul. 28, 2003).

(56) References Cited

OTHER PUBLICATIONS

IBM Lotus Software, Sametime Everyplace Wireless Collaboration that's Fit for e-Business, pp. 1-6, http://www.lotus.com/products.wireless.nsf/allpublic . . . , (visited Jul. 28, 2003).
IM Means Business IEEE Spectrum, Nov. 2002.
imForwards.com-FAQ's; Oct. 21, 2003.
Index of /tarvizo/oldfiles/elips/tnt-2.4, Jul. 2, 2001, TNT, http://web.mit.edu/tarvizo/oldfiles/elips/tnt-2.4/.
Instant messaging in teen life, Grinter, R.E. and Palen, L., Proceedings of the 2002 ACM conference on Computer supported cooperative work, pp. 21-30, Nov. 2002, ACM Press, New York, NY, USA.
Instant Messaging with Mobile Phones to Support Awareness, Mitsuoka, M. and Watanabe, S. and Kakuta, J. and Okuyama, S., pp. 223-230, Jan. 2001, IEEE.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbmn1+0 &adxnnlx=107029 . . . , printed on Nov. 5, 2004 (2 pages).
"Instant Messaging for Garners," PC Gamer, May 2004, vol. 11, No. 5, (2 pages).
J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
J. Dudley, "Telstra targets Net spammers", news.com.au , Dec. 2, 2003.
Jabber, Inc., Jabber Wireless Gateway Overview, May 2001.
"Jabber" http://www.jabber.com/index.cgi?CONTENTID=9, as accessed on Dec. 4, 2003.
Jennifer B. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, available at http://www.wired.com/culture/lifestyle/news/2003/11/61227?currentPage=al.
Jonathan B Postel, "Simple Mail Transfer Protocol", RFC788, Information Science Institute, Nov. 1981.
Julian Byrne, "My Spamblock was thrwarting UCE address culling programs", news.admin.net-abuse.e-mail, Jan. 19, 1997.
"Knock Settings ServersTab," http://www.knockmail.com/support/advserverset.html, pp. 1-2, as accessed on Dec. 4, 2003.
Komatsu et al., "Text Input with Dynamic Abbreviation Expansion," IPSJ SIG Notes, vol. 2001, No. 87, Sep. 14, 2008, pp. 133-138, in Japanese with a partial English Translation.
Kirk Scott, Ubique's Virtual Places: Communication and interaction on the World Wide Web', 1 page, http://www.w3.org/collabroation/workshop/proceedings/p2.html, (visted Jul. 28, 2003).
Kyungkoo Jun, et al., "Agent-Based Resource Discovery", IEEE (Feb. 2000), 10 pages.
Laliberte et al., "A Protocol for Scalable Group and Public Annotations," Elsevier, Apr. 1995, pp. 911-918.
Leander Kahney, "Will You Buy a Car From This Man?", Oct. 6, 2003, pp. 1-3, available at http://www.wired.com/techbizlmedia/news/2003/10/60703.
"Learning Spam: Simple Techniques for Freely-Available Software," Bart Massey et ai, Computer Science Dept., Portland, OR USA, Apr. 2003, pp. 1-14.
"Lotus Instant Messaging Everyplace FAQ," retrieved Apr. 29, 2004 from the World Wide Web: http://www.lotus.com/products/product4nsf/wdocs/249c6f083166cd3e85256d7300714407, (3 pages).
Lieberman, H., "Letizia: An Agent that Assists Web Browsing", Aug. 20, 1995, pp. 924-929.
"Listserv Control for KnockKnock," http://www.knockmail com/supporUlistservcont.html, pp. 1, as accessed on Dec. 4, 2003.
Luis Felipe Cabrera et al., "Herald: Achieving a Global Event NotificationService", Microsoft Research, May 2001.

M. Castelluccio, "E-mail in Real Time", Strategic Finance, Sep. 1999, INSPEC p. 10.
M. Day, S Aggarwal, G Mohr, J. Vincent, RFC 2279 Instant Messaging/Presence Protocol Requirements, Feb. 2000.
M. Meola et al., "Real-Time Reference Service for the Remote User: From the Telephone and Electronic Mail to Internet Chat, Instant Messaging and Collaborative Software", Reference Librarian, Dec. 1999, INSPEC p. 8.
M. Smith et al.; Conversation Trees and Threaded Chats; Collaboration & Multimedia Group, Microsoft Research, Redmond, WA, Feb. 2000.
"Managing your Addresses in Knockmail," http://www.knockmail.com/supporUmanaddresses.html, pp. 1-2, as accessed on Dec. 4, 2003.
McMurray, Susan, "Shield your children from unsuitable Internet content," http://www.microsoft.com/canada/home/internet&security/2.4.8protectwithparentalcontrolshowtosafeguardyourcomputer.asp#, Microsoft Home Magazine, pp. 1-3, as accessed on Dec. 10, 2003.
Mark Handel et al., "TeamPortal: Providing Team Awareness on the Web", Dec. 2000.
McKendrick, Joseph; "Internet Call Centers: New Era in Customer Service", Feb. 2002; VIO, n2, (4 pages).
Microservices: CommWorks Find Me-Follow Me Application; Dec. 11, 2002; commworks.com; pp. 1-2.
Microservices: CommWorks Message Alert System; Dec. 11, 2002; commworks.com; pp. 1-3.
Microservices: CommWorks Message Delivery System; Dec. 11, 2002; commworks.com; pp. 1-2.
Microsoft PressPass; Nov. 7, 2002; microsoft.com ; pp. 1-9.
Mobile instant messaging through Hubbub, Issacs, E. and Walendowski, A. and Ranganathan, D., Communications of the ACM, vol. 45, No. 9, pp. 68-72, Sep. 2002, ACM Press New York, NY USA.
Midorikawa, et al., "Part 2 Build up a Comfortable Search Environment via Customization by Rules," PC Japan, vol. 7, No. 10, pp. 172-176, in Japanese with a partial English Translation of page 172, Nov. 2002.
Mozilla, www.mozilla.org/projects/ml/autocomplete, Mar. 13, 2003.
Moore, J. "AOL's Grand Goal; America Online seeks to transform itself into a major Internet player,"Information Week, Jul. 31, 1995, lines 7-23, pp. 38-42.
N. Liew Kwek Sing; AOL ICQ vs. MSN Messenger; Department of Electronic and Computer Science, University of Southampton, Mar. 2003.
Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennslyvannia, USA.) CSCW '00. ACM New York, NY, 79-88.
Nextel Announces On-Line Paging Service Provided by Wireless Services—First Wireless Telephone Messaging Service to Offer Delivery Confirmation, Aug. 12, 1998, NY.
Net Alerts Overview; Nov. 7, 2002; microsoft.com ; pp. 1-3.
Neo Mai, Ken Neo. "Buying and selling on the internet; [Computimes, 2* Edition]." New Straits Times. Kuala Lumpur: Jun. 28, 2001. p. 53.
Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep. 17, 2004 the whole document.
Olsen, Stefanie, "Will instant messaging become instant spamming?,". http://news.com.com/2100-1023 -252765.html?legacy=cnet, Feb. 16, 2001, pp. 1-4.
Ozmosys Enterprise; Nov. 7, 2002; ozmosys.com ; pp. 1-3.
"Pending Database for KnockKnock," http://www.knockmail coml support/penddatabase.html, pp. 1, as accessed on Dec. 4, 2003.
"Preview Pending Emails in KnockMail," http://www.knockmail.com/supporUpreviewemail.html, pp. 1-2, as accessed on Dec. 4, 2003.
"Protect Your Privacy," MSN Features, http://messenger.msn.com/Feature/Privacy.aspx, as accessed on Dec. 2, 2003.

(56) References Cited

OTHER PUBLICATIONS

Parviainen et al., "Mobile Instant Messaging", Jul. 3, 2003 IEEE.
Patrice Godefroid et al., "Ensuring Privacy in Presence Awareness Systems: An Automated Verification Approach". Feb. 2000.
Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.
Per E. Pedersen et al.; Using the Theory of Planned Behavior to Explain Teenager's Adoption of Text Messaging Services; Agder University College, Jun. 2002.
Per E. Pedersen; The Adoption of Text Messaging services among Norwegian Teens: Development and Test of an Extended Adoption Model; SNF-Report No. 23/02; Samfunns-Og Naeringslivsforskning As Bergen, Jun. 2002.
Phillips Business Information corporation—Aug. 23, 1999—Instant messaging has emerged as one of the most popular communication mediums in the world.
Prodigy Launches 100 Interest Groups on the World Wide Web; All Sites Have Deep Links to Chat and Newsgroups; Topics Range from "Adventure Travel" and "Astrology" to "Virtual Reality" and "Wrestling", Business Wire, Sep. 27, 1995, 4 Pages.
"Plaxo-Update Your Address Book," Plaxo Contact Networks, reprinted from http://web.archive.org/web/20030218233638/http://www.plaxo.com printed on Nov. 5, 2004 (available on Feb. 18, 2003), (1 page).
"Plaxo", Plaxo, reprinted from http://web.archive.org/web/20041105072256/http://www.plaxo.com/ printed on Nov. 5, 2004 (available on Feb. 14, 2004) (2 pages).
Parent Tools TheUltimate in Monitoring and Controlling AIM "Parent Tools for AIM," http://www.parent-tools.com/screenshots.htm, pp. 1-4, as accessed on Dec. 10, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-Instant -Messaging-20 . . . , pp. 1-4.
"Reflections on Friendster, Trust and Intimacy," Danah Boyd, Ubicomp 2003, Workshop Application for the Intimate Ubiquitous Computing Workshop. Seattle, WA, Oct. 12-15, 2003, (4 pages).
R. Movva & W. Lai, "MSN Messenger Service 1.0 Protocol", Aug. 1999, Internet Draft, http://toolsietf.org/id/draft-movva-msn-messenger-protocol-oo.bct, 28 pages.
Reichard, K., "AOL, ICO to Interoperate—But in a Limited Fashion," Oct. 30, 2002, InstantMessagingPlanet, available at www.instantmessagingplanet.com/public/articie.php/1490771.
Ryze home page, www.ryze.com , Dec. 21, 2003, available at http://web.archivesorg/web/20031221010006/http://ryze .com, printed Mar. 16, 2005, 13 pages.
R. Droms, "Dynamic Host Configuration Protocol", Network Working Group, Oct. 1993.
Richard S. Hall, "The Event Desktop: Supporting Event-Enabled Clients on the Web", Freie University, Berlin. Retrieved on Dec. 12, 2012.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, Apr. 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vol. 38, No. 10, pp. 134-141, Oct. 2000.
SproWuest Wireless Instant messaging (Nov. 22, 1999) InfoSpace.com, pp. 1-2.
"Six Degrees—New Programs Help Companies 'Mine Workers' Relationships for Key Business Prospects," William M. Bulkeley et al., Marketplace, The Wall Street Journal, Aug. 4, 2003, (3 pages).
SM Cherry "Talk is Cheap, Text is Cheaper" (IEEE Spectrum May 2003).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com , (36 pages).
"Support Vector Machines for Spam, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
Solutions Smartdelivery; Nov. 6, 2002; centerpost.com ; pp. 1-2.
"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDM '2001 (IEEE ICDM—2001 Workshop on Text Mining); San Jose, CA, 2001, pp. 1-14, Nov. 2001.
The Wall Street Journal article "Esniff Ferrets Out Misbehavior by 'Reading' E-Mail, Web Visits," Katherine Lange, interactive.wsj.com, Apr. 27, 2001, Tech Q&A.
The Early Report—The Early Show segment, "Big Brother in the Corner Office," Julie Chen, cbsnews.com/earlyshow/caught/techage/20001228esniff.shtml, Dec. 28, 2000: Tech Age.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"The eSniff Product Overview," eSniff: Define Your e-Boundaries, www.esniff.com/product overview.html, May 15, 2001.
"Text Categorization with Support Vector Machines: Learning with Many Relevant Features," Thorsten Joachims, University of Dortmund, Computer Science Dept., LS-8 Report 23, 1998, (18 paqes), Nov. 27, 1997, revised Apr. 19, 1998.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat—Instant Messaging is Taking Off, and for Some Users It's Nuzzling Out the Phone," Nick Wingfield, Asian WSJ, Sep. 2000, (5 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of AUUG2002, Melbourne, Sep. 4-6, 2002, (17 pages).
Tara Hall, Lotus Developer Domain, "Same Place, Sometime with Chris Price", pp. 1-8, http://www.10.lotus.com/ldd/today.nsf/DisplayForm/. . . , (Visited Jul. 28, 2003), Sep. 2002.
Teraitech; Nov. 7, 2002; teraitech.com ; 1 page.
Uhara7, "Re. being invisible to all but one person on your list", alt.chat-programs.icq, Feb. 29, 2000.
Upoc Quick Tour; Nov. 6, 2002; upoc.com; pp. 1-9.

(56) References Cited

OTHER PUBLICATIONS

Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com ; pp. 1-5, Nov. 2002.
V. Vittore, "The Next Dial Tone? [instant messaging]", Telephony, Oct. 16, 2000, INSPEC p. 8.
VisiblePath webpages, www.visiblepath.org , Dec. 3, 2003, available at http://web. archive. org/web/20031203132211/http://www. visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity-Home, reprinted from http://web.archive.org/web/20030228131435/www. huminity.com/default.php?intemationa . . . printed on Nov. 5, 2004 (available on Feb. 2, 2003) (1 page).
WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.
Viva Hard af Segerstad et al.; Awareness of Presence, Instant Messaging and WebWho; Department of Linguistics, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.
ZeroDegrees home page, www-zerodegrees.com , Jan. 24, 2004, available at http://web.archive.org/web/20040204153037/www. zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
European Search Report, European Application No. 03781972.9-2201, dated Feb. 8, 2008, 5 pages.
Notification of Transmittal of the International Search Report and the Written Opinion of the International Searching Authority for International Application No. PCT/US2004/029291; Dec. 27, 2005; 9 pages.
English translation of an Office Action issued in corresponding Japanese Application No. 2004-570418 on Aug. 7, 2008.
English translation of an Office Action issued in corresponding Japanese Application No. 2004-570418 on Feb. 5, 2009.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (3 pages).
International Search Report issued in International Application No. EP03731244, dated Aug. 30, 2005, (4 pages).
Supplementary European Search Report issued in European Application No. EP05728303, dated Jan. 9, 2009, (4 pages).
Supplementary European Search Report issued in European Application No. 05857099.5-1238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. EP 03811631, 3 pages.
Notification of Transmittal of the International Search Report or the Declaration dated Jun. 23, 2004 for International Application Serial No. PCT/US03/36795.
Office Action issued in Chinese Application No. 200480013443.9, mailed Mar. 6, 2009, 20 pages, including English translation.
Office Action mailed Apr. 21, 2005 for European Application No.97946924.4-1238, 6 pages.

Office Action mailed May 21, 2008 for European Application No. 97946924.4-1238, 10 pages.
International Search Report and Written Opinion for International Application No. PCT/US05/45630, Dated Oct. 23, 2006.
International Search Report dated Jan. 27, 2005 for International Application No. PCT US2004/009422, International Filing Date Mar. 26, 2004.
International Search Report issued in International Application No. PCT/US03/36795 mailed Jun. 23, 2004, 9 Pages.
International Search Report mailed Dec. 27, 2005 for International Application No. PCT/US2004/29291, filed Sep. 8, 2004.
International Search Report, Application Serial No. PCT/USO4/23382, dated Feb. 1, 2007, 12 pages.
International Search Report of PCT/US03/36654 dated Aug. 17, 2004.
International Standard, Information technology—telecommunications and information exchange between systems—private integrated services network—specifications, functional model and information flows—Short message service, ISO/IEC21989, Jul. 1, 2002.
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.
European Office Action, Application Serial No. 03 811 631.5-2201, dated Oct. 4, 2006, 4 pages.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
U.S. Appl. No. 10/146,814, filed Dec. 11, 2006, Office Action.
U.S. Appl. No. 10/146,814, filed Jul. 2, 2007, Office Action.
U.S. Appl. No. 10/184,002, filed Jan. 9, 2007, Office Action.
U.S. Appl. No. 10/334,056, filed Nov. 29, 2004, Office Action.
U.S. Appl. No. 10/334,056, filed Jul. 6, 2005, Office Action.
U.S. Appl. No. 10/334,056, filed Oct. 31, 2005, Office Action.
U.S. Appl. No. 10/334,056, filed May 10, 2006, Office Action.
U.S. Appl. No. 10/334,056, filed May 21, 2007, Office Action.
U.S. Appl. No. 10/334,056, filed Nov. 5, 2007, Office Action.
U.S. Appl. No. 10/334,056, filed May 12, 2008, Office Action.
U.S. Appl. No. 10/334,056, filed Oct. 30, 2008, Office Action.
U.S. Appl. No. 10/633,636, filed Oct. 11, 2006, Office Action.
U.S. Appl. No. 10/651,303, filed Feb. 9, 2007, Office Action.
U.S. Apppl. No. 10/651,303, filed Apr. 28, 2008, Office Action.
U.S. Appl. No. 10/651,303, filed Oct. 8, 2008, Office Action.
U.S. Appl. No. 10/651,303, filed May 1, 2009, Office Action.
U.S. Appl. No. 10/651,303, filed Nov. 27, 2009, Office Action.
U.S. Appl. No. 10/651,303, filed Mar. 11, 2011, Notice of Allowance.
U.S. Appl. No. 10/715,206, filed Sep. 27, 2007, Office Action.
U.S. Appl. No. 10/715,206, filed Jul. 25, 2008, Notice of Allowance.
U.S. Appl. No. 10/715,206, filed Jan. 27, 2009, Office Action.
U.S. Appl. No. 10/715,206, filed Aug. 13, 2009, Notice of Allowance.
U.S. Appl. No. 10/715,210, filed Sep. 27, 2007, Office Action.
U.S. Appl. No. 10/715,210, filed Apr. 14, 2008, Office Action.
U.S. Appl. No. 10/715,210, filed May 13, 2009, Office Action.
U.S. Appl. No. 10/715,210, filed Mar. 29, 2010, Notice of Allowance.
U.S. Appl. No. 10/715,211, filed Jan. 8, 2008, Office Action.
U.S. Appl. No. 10/715,211, filed Jul. 11, 2008, Office Action.
U.S. Appl. No. 10/715,211, filed Nov. 28, 2008, Office Action.
U.S. Appl. No. 10/715,211, filed Jun. 24, 2009, Office Action.
U.S. Appl. No. 10/715,211, filed Oct. 2, 2009, Notice of Allowance.
U.S. Appl. No. 10/715,211, filed Feb. 3, 2010, Office Action.
U.S. Appl. No. 10/715,211, filed Jul. 14, 2010, Office Action.
U.S. Appl. No. 10/715,211, filed Oct. 25, 2010, Notice of Allowance.
U.S. Appl. No. 10/715,213, filed Apr. 26, 2007, Office Action.
U.S. Appl. No. 10/715,213, filed Oct. 22, 2007, Office Action.
U.S. Appl. No. 10/715,213, filed Aug. 7, 2008, Office Action.

(56) References Cited

OTHER PUBLICATIONS

U.S. Appl. No. 10/715,213, filed Feb. 5, 2009, Office Action.
U.S. Appl. No. 10/715,213, filed Aug. 6, 2009, Office Action.
U.S. Appl. No. 10/715,213, filed Jul. 18, 2013, Office Action.
U.S. Appl. No. 10/715,214, filed Apr. 20, 2007, Office Action.
U.S. Appl. No. 10/715,214, filed Oct. 9, 2007, Office Action.
U.S. Appl. No. 10/715,215, filed Mar. 23, 2007, Office Action.
U.S. Appl. No. 10/715,215, filed Aug. 20, 2007, Office Action.
U.S. Appl. No. 10/715,215, filed Nov. 20, 2010, Notice of Allowance.
U.S. Appl. No. 10/715,216, filed Feb. 12, 2007, Office Action.
U.S. Appl. No. 10/715,216, filed Jan. 11, 2008, Office Action.
U.S. Appl. No. 10/715,216, filed Aug. 18, 2009, Office Action.
U.S. Appl. No. 10/723,040, filed Mar. 14, 2006, Office Action.
U.S. Appl. No. 10/723,040, filed Jun. 26, 2006, Office Action.
U.S. Appl. No. 10/723,040, filed Jan. 4, 2007, Office Action.
U.S. Appl. No. 10/723,040, filed Jun. 4, 2007, Office Action.
U.S. Appl. No. 10/723,040, filed Oct. 25, 2007, Office Action.
U.S. Appl. No. 10/723,040, filed May 21, 2008, Notice of Allowance.
U.S. Appl. No. 10/746,230, filed Mar. 17, 2009, Office Action.
U.S. Appl. No. 10/746,232, filed Mar. 18, 2009, Office Action.
U.S. Appl. No. 10/747,263, filed Mar. 5, 2008, Office Action.
U.S. Appl. No. 10/747,263, filed Sep. 5, 2008, Office Action.
U.S. Appl. No. 10/747,263, filed Feb. 11, 2009, Notice of Allowance.
U.S. Appl. No. 10/747,263, filed Jun. 2, 2009, Notice of Allowance.
U.S. Appl. No. 10/747,651, filed Mar. 5, 2008, Office Action.
U.S. Appl. No. 10/747,651, filed Feb. 20, 2009, Office Action.
U.S. Appl. No. 10/747,676, filed Sep. 21, 2007, Office Action.
U.S. Appl. No. 10/747,676, filed Mar. 31, 2008, Office Action.
U.S. Appl. No. 10/747,678, filed Sep. 14, 2007, Office Action.
U.S. Appl. No. 10/747,678, filed Mar. 27, 2008, Office Action.
U.S. Appl. No. 10/747,678, filed Jun. 12, 2008, Office Action.
U.S. Appl. No. 10/747,678, filed Dec. 15, 2008, Office Action.
U.S. Appl. No. 10/747,678, filed Jun. 5, 2009, Notice of Allowance.
U.S. Appl. No. 10/747,678, filed Jun. 19, 2009, Notice of Allowance.
U.S. Appl. No. 10/747,682, filed Oct. 11, 2007, Office Action.
U.S. Appl. No. 10/747,682, filed Apr. 7, 2008, Office Action.
U.S. Appl. No. 10/747,682, filed Aug. 19, 2008, Office Action.
U.S. Appl. No. 10/747,682, filed Mar. 18, 2009, Office Action.
U.S. Appl. No. 10/747,682, filed Nov. 2, 2009, Office Action.
U.S. Appl. No. 10/747,682, filed Jun. 11, 2010, Office Action.
U.S. Appl. No. 10/747,682, filed Dec. 2, 2010, Office Action.
U.S. Appl. No. 10/747,682, filed Oct. 5, 2011, Notice of Allowance.
U.S. Appl. No. 10/825,617, filed Jun. 24, 2008, Office Action.
U.S. Appl. No. 10/825,617, filed Mar. 9, 2009, Notice of Allowance.
U.S. Appl. No. 10/825,617, filed Sep. 10, 2009, Notice of Allowance.
U.S. Appl. No. 10/895,421, filed Jan. 9, 2007, Office Action.
U.S. Appl. No. 10/895,421, filed Jun. 27, 2007, Office Action.
U.S. Appl. No. 10/895,421, filed Apr. 16, 2008, Office Action.
U.S. Appl. No. 10/895,421, filed Nov. 19, 2008, Notice of Allowance.
U.S. Appl. No. 10/895,421, filed Apr. 17, 2009, Notice of Allowance.
U.S. Appl. No. 10/974,969, filed Mar. 17, 2008, Office Action.
U.S. Appl. No. 10/974,969, filed Mar. 6, 2009, Office Action.
U.S. Appl. No. 10/974,969, filed Sep. 8, 2009, Notice of Allowance.
U.S. Appl. No. 10/981,460, filed Aug. 20, 2008, Office Action.
U.S. Appl. No. 11/015,423, filed Mar. 2, 2009, Office Action.
U.S. Appl. No. 11/015,424, filed Mar. 19, 2008, Office Action.
U.S. Appl. No. 11/015,424, filed May 1, 2009, Office Action.
U.S. Appl. No. 11/015,476, filed Mar. 2, 2009, Office Action.
U.S. Appl. No. 11/017,204, filed Dec. 12, 2007, Office Action.
U.S. Appl. No. 11/017,204, filed Jun. 23, 2008, Office Action.
U.S. Appl. No. 11/023,652, filed Aug. 30, 2010, Office Action.
U.S. Appl. No. 11/023,652, filed May 12, 2011, Office Action.
U.S. Appl. No. 11/023,652, filed Dec. 8, 2011, Office Action.
U.S. Appl. No. 11/023,652, filed Sep. 24, 2012, Office Action.
U.S. Appl. No. 11/023,652, filed Oct. 25, 2013, Office Action.
U.S. Appl. No. 11/079,522, filed Oct. 16, 2008, Office Action.
U.S. Appl. No. 11/079,522, filed Apr. 3, 2009, Office Action.
U.S. Appl. No. 11/237,718, filed Apr. 2, 2009, Office Action.
U.S. Appl. No. 11/408,166, filed Mar. 18, 2009, Office Action.
U.S. Appl. No. 11/408,166, filed Oct. 7, 2009, Office Action.
U.S. Appl. No. 11/408,166, filed Sep. 2, 2010, Office Action.
U.S. Appl. No. 11/408,166, filed Apr. 13, 2011, Office Action.
U.S. Appl. No. 11/408,166, filed Oct. 17, 2011, Office Action.
U.S. Appl. No. 11/464,816, filed Apr. 21, 2009, Office Action.
U.S. Appl. No. 11/574,831, filed Sep. 18, 2009, Office Action.
U.S. Appl. No. 11/574,831, filed May 16, 2010, Office Action.
U.S. Appl. No. 11/574,831, filed Sep. 9, 2010, Office Action.
U.S. Appl. No. 11/574,831, filed Apr. 15, 2011, Office Action.
U.S. Appl. No. 11/574,831, filed Oct. 13, 2011, Notice of Allowance.
U.S. Appl. No. 12/236,255, filed Apr. 2, 2010, Office Action.
U.S. Appl. No. 12/236,255, filed Sep. 17, 2010, Office Action.
U.S. Appl. No. 12/236,255, filed Feb. 3, 2011, Office Action.
U.S. Appl. No. 12/548,338, filed Nov. 9, 2010, Office Action.
U.S. Appl. No. 12/548,338, filed May 19, 2011, Office Action.
U.S. Appl. No. 12/548,338, filed Dec. 9, 2011, Notice of Allowance.
U.S. Appl. No. 12/626,099, filed Sep. 17, 2010, Office Action.
U.S. Appl. No. 12/626,099, filed Mar. 30, 2011, Notice of Allowance.
U.S. Appl. No. 12/689,699, filed Feb. 28, 2011, Office Action.
U.S. Appl. No. 12/689,699, filed Apr. 23, 2012, Office Action.
U.S. Appl. No. 12/689,699, filed Oct. 9, 2012, Notice of Allowance.
U.S. Appl. No. 12/689,699, filed Mar. 11, 2013, Office Action.
U.S. Appl. No. 12/689,699, filed Jun. 18, 2013, Notice of Allowance.
U.S. Appl. No. 13/023,256, filed Jun. 21, 2011, Office Action.
U.S. Appl. No. 13/023,256, filed Nov. 28, 2011, Office Action.
U.S. Appl. No. 13/023,256, filed Apr. 16, 2012, Office Action.
U.S. Appl. No. 13/023,256, filed Sep. 28, 2012, Office Action.
U.S. Appl. No. 13/023,256, filed Jun. 21, 2013, Office Action.
U.S. Appl. No. 13/023,256, filed Nov. 7, 2013, Office Action.
U.S. Appl. No. 13/048,312, filed Nov. 22, 2011, Office Action.
U.S. Appl. No. 13/048,312, filed Mar. 13, 2012, Notice of Allowance.
U.S. Appl. No. 13/184,414, filed Aug. 17, 2012, Notice of Allowance.
U.S. Appl. No. 13/184,414, filed Nov. 28, 2012, Notice of Allowance.
U.S. Appl. No. 13/184,414, filed Jan. 29, 2013, Notice of Allowance.
U.S. Appl. No. 13/189,972, filed Oct. 29, 2013, Office Action.
U.S. Appl. No. 13/189,972, filed Jul. 24, 2013, Office Action.
U.S. Appl. No. 13/189,972, filed Dec. 21, 2012, Office Action.
U.S. Appl. No. 13/189,972, filed Aug. 22, 2012, Notice of Allowance.
U.S. Appl. No. 13/189,972, filed May 7, 2012, Office Action.
U.S. Appl. No. 13/189,972, filed Jan. 5, 2012, Office Action.
U.S. Appl. No. 13/189,972, filed Sep. 2, 2011, Office Action.
U.S. Appl. No. 13/372,371, filed May 9, 2013, Office Action.
U.S. Appl. No. 13/507,429, filed Oct. 25, 2013, Office Action.
U.S. Appl. No. 13/614,640, filed Oct. 2, 2013, Office Action.
U.S. Appl. No. 13/614,781, filed Jun. 4, 2013, Office Action.
U.S. Appl. No. 13/614,781, filed Sep. 12, 2013, Office Action.
U.S. Appl. No. 13/617,270, filed Sep. 12, 2013, Office Action.
U.S. Appl. No. 13/617,330, filed Sep. 12, 2013, Office Action.
U.S. Appl. No. 13/619,009, filed Mar. 7, 2013, Office Action.
U.S. Appl. No. 13/619,009, filed Sep. 19, 2013, Office Action.
U.S. Appl. No. 13/619,036, filed Mar. 26, 2013, Office Action.
U.S. Appl. No. 13/619,036, filed Sep. 16, 2013, Office Action.
U.S. Appl. No. 13/619,054, filed Mar. 26, 2013, Office Action.
U.S. Appl. No. 13/619,054, filed Oct. 10, 2013, Office Action.
U.S. Appl. No. 13/620,851, filed Feb. 8, 2013, Office Action.
U.S. Appl. No. 13/620,853, filed Feb. 13, 2013, Office Action.
U.S. Appl. No. 13/620,856, filed Feb. 13, 2013, Office Action.
U.S. Appl. No. 13/361,141, filed Mar. 19, 2013, Office Action.
U.S. Appl. No. 13/361,141, filed Aug. 15, 2013, Office Action.
U.S. Appl. No. 13/729,318, filed Sep. 18, 2013, Office Action.
U.S. Appl. No. 13/755,990, filed Oct. 2, 2013, Office Action.
U.S. Appl. No. 13/766,775, filed Sep. 19, 2013, Office Action.
U.S. Appl. No. 13/766,779, filed Oct. 15, 2013, Office Action.

INTELLIGENT RESULTS USING A SPELLING CORRECTION AGENT

CROSS-REFERENCE TO RELATED APPLICATIONS

This application is a continuation of U.S. patent application Ser. No. 13/734,738 filed Jan. 4, 2013, which is a continuation of U.S. patent application Ser. No. 13/184,414 filed on Jul. 15, 2011, which is a continuation of U.S. patent application Ser. No. 10/651,303 filed Aug. 29, 2003, now U.S. Pat. No. 8,005,919, which claims priority to: U.S. Provisional Application Ser. No. 60/426,806 filed Nov. 18, 2002; U.S. Provisional Application Ser. No. 60/427,944 filed Nov. 21, 2002; U.S. Provisional Application Ser. No. 60/471,337 filed May 19, 2003; U.S. Provisional Application Ser. No. 60/471,338 filed May 19, 2003; and U.S. Provisional Application Ser. No. 60/488,400 filed Jul. 21, 2003. The contents of each of the aforementioned applications and patents are hereby incorporated by reference in their entirety.

TECHNICAL FIELD

This document relates to content retrieval and presentation.

BACKGROUND

The Internet enables users to access a great amount of information. A user with a web browser, messaging application, or other proprietary application may retrieve information from large libraries to access great amounts of information. Navigating the great amount of information can challenge some users.

SUMMARY

In one general sense, information may be presented to a user by using a first application to receive a character stream of one or more non-completion characters that indicate that additional characters may be received, exchanging the character stream with a host to analyze the character stream to generate results that are responsive to the user's predicted interest, receiving the results, and displaying the results so that the user may select one of the results to launch a code segment related to a selected result.

For example, a web browser may receive the character stream in an address line and exchange the character stream with a host that generates mapping results that are responsive to the user's predictive interest. The web browser receives the mapping results and displays the mapping results with an overview map so that the user may select one of the overview maps to display more detailed mapping information.

Implementations may include one or more of the following features. For example, the first application may receive one or more updates to the character stream, and may exchange the updates to the character stream with the host to permit the host to analyze the character stream using the updates to generate updated results that are responsive to the user's predicted interest. The updated results may be received and displayed so that the user may select one of the updated results to launch a code segment related to a selected result.

Exchanging the updates may include exchanging all of the characters in the character stream, or exchanging one or more characters in the character stream that have been received since the character stream was last exchanged.

Exchanging the character stream may include determining whether a sufficient amount of data in the character stream exists to generate accurate results, and, if so, analyzing the character stream to display the results.

Analyzing the character stream may be delayed when there is an insufficient amount of data in the character stream to generate accurate results. Determining whether the sufficient amount of data exists in the character stream may include waiting until a predetermined number of characters has been entered, waiting until a predetermined amount of time has elapsed since the user last entered a character in the character stream, or waiting until the predetermined number of characters has been entered, unless the predetermined amount of time has elapsed since a last character in the character stream has been entered.

Analyzing the character stream may include identifying results that are more responsive to the predicted interest of the user. Displaying the results may include displaying the results that are more responsive to the predicted interest of the user.

Displaying the results so that the user may select one of the results to launch a code segment may include enabling the user to launch a second application that is different from the first application that receives the character stream. Exchanging the character stream with a host may include polling multiple databases to identify results from each of the multiple databases.

The user may be enabled to configure the first application to control an operating mode of the first application. For example, the user may be enabled to select one or more databases to be accessed, to control a format with which the results are displayed, or to control a configuration for a drop down menu used to display results.

The character stream may be analyzed to determine a user profile, which may be stored and used to analyze subsequent character streams from the first application.

Displaying the results may include displaying a map related to the character stream. Using the first application to receive the character stream may include analyzing the character stream before exchanging the character stream to identify that map information is related to the character stream. Analyzing the character stream may include recognizing that a commonly used address term, such as a zip code, a state identifier or a city identifier, is present in the character stream.

Using the first application to receive the character stream may include analyzing the character stream before exchanging the character stream to identify that vendor information is related to the character stream, and instructing the host to return vendor information in the results. Identifying vendor information may include identifying yellow page information related to the character stream or a category and a location appearing in the character stream.

The character stream may be analyzed for a messaging label appearing in the character stream. Analyzing the character stream for the messaging label and displaying the results may include presenting a messaging code segment that enables the user to communicate with another user.

Analyzing the character stream may include determining that a user identifier appears in the character stream. When such a user identifier appears, an online status of a user associated with the user identifier may be determined. Determining the online status and displaying the results may include enabling the user to exchange an instant message with the user associated with the user identifier. Analyzing the character stream for the messaging label may include recognizing that an '@' character appears in the character stream as an indication that an electronic mail message will be exchanged.

The results may be stored for subsequent access. Storing the results includes storing the results the user has selected. A first application may be used to receive a second stream of one or more non-completion characters where the non-completion characters indicate that additional characters may be received. The stored results may be accessed and related to the second stream.

The stored results may be displayed when the second stream indicates that the user is requesting information related to the stored results. The second stream may be exchanged with the host to analyze the second stream. Second stream results may be received and displayed so that the user may select one of the second stream results to launch a code segment related to the second stream result, when the stored results do not relate to the second stream. The operations described previously may be performed on a client or a host system.

The details of one or more implementations are set forth in the accompanying drawings and the description below. Other features will be apparent from the description and drawings, and from the claims.

DETAILED DESCRIPTION

Figure 1:
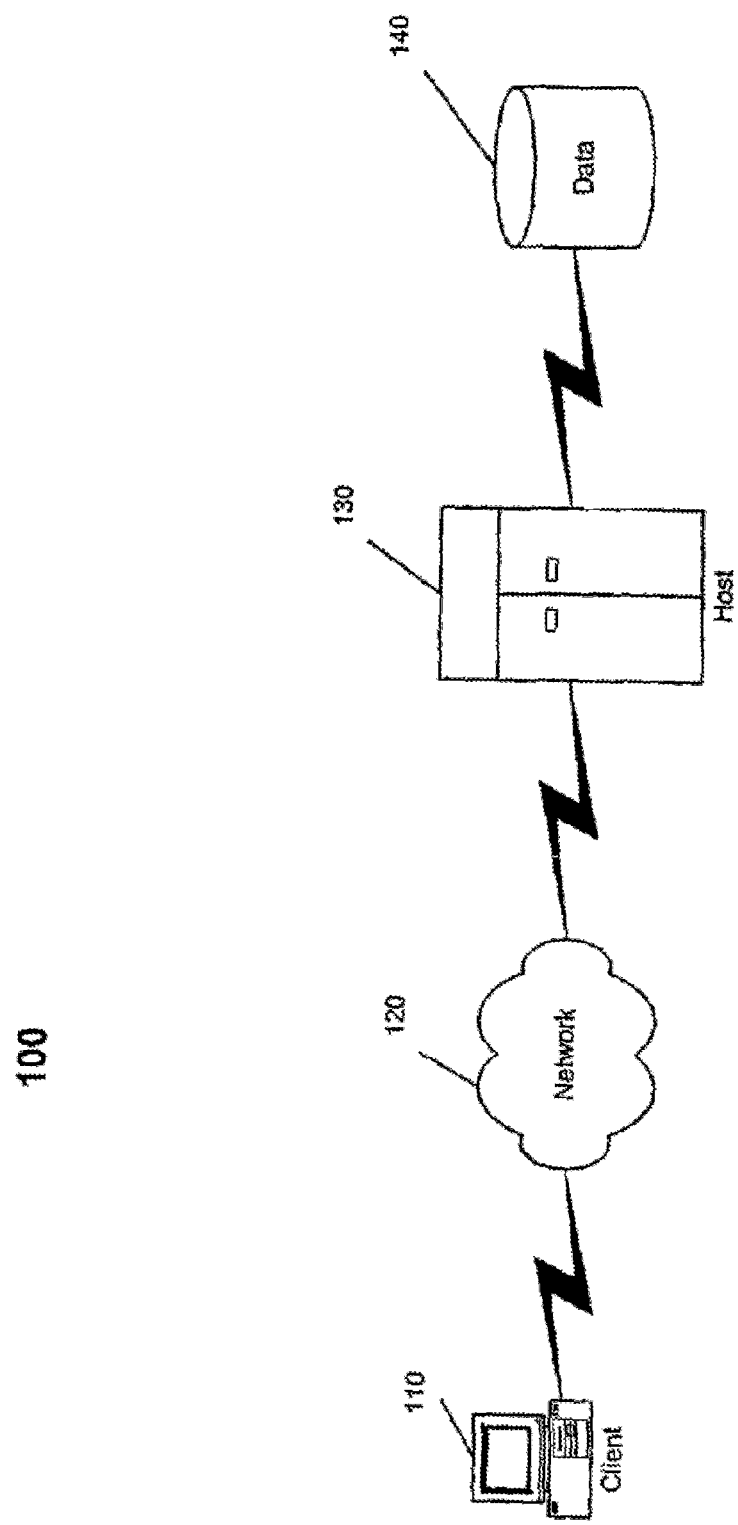
FIG. 1 illustrates a communications system that may be used to intelligently present results related to a character stream analyzed by a host.

The Internet enables access to large volumes of content. A key challenge in providing a better access experience for users is enabling the users to access information most relevant to their interests with the least amount of effort in retrieving the results.

To assist users, an application enables users to enter a character stream into an application such as a web browser. The character stream includes noncompletion characters, which are characters that the user types in a field or form before entering a completion character such as a carriage return (e.g., the 'Enter' key). The application may exchange this character stream with a host so that the host may analyze the character stream. The host analyzes the character stream, and generates results predicted to be of interest to the user. For example, when the character stream includes the string "plumbe", the host may generate access to a yellow page database and retrieve a list of plumbers available to support the user. Note that the results may be identified without waiting to receive the completed character stream for "plumber" or "plumber (carriage return)".

In another example, the user may enter "20005" as a character stream. The host may retrieve maps and business references located in the area of Washington, D.C. that lies within zip code 20005. Note that in this example, the user did not identify a mapping label or include the words "zip code" to retrieve the results for zip code 20005. Rather, the character stream is analyzed so that potential mapping results may be considered and/or displayed.

In any event, regardless of the results that are identified on the host, the results are returned to the client, which then may display all or a portion of the results. The results are displayed in such a manner that the user may select one of the results to launch a code segment related to the selected item. For example, if the displayed results include a list of plumbers available to support the user, selecting one of the entries may launch a web page operated by a particular plumber. In another example, a phone call, an electronic mail message or an instant message may be transmitted to the plumber whose entry was selected from the list of results.

The user may continue to enter one or more characters in the character stream, and the results may be modified based on recently received characters. For example, when a character stream is analyzed initially after entering "spring", results related to the season of spring and products using the term "spring" may be returned. When the user types an "f" character, the "f" character may be transmitted to the host, which in turn generates results related to "springf". In one example, the previous results related to "spring" are filtered to generate a new list that only includes content related to "springf". In another example, a new query is run identifying terms related to "springf".

Regardless of how the query is structured, the host identifies results related to "springf", which may include one or more selections related to cities and towns named Springfield. Results for multiple towns may be presented in a portion of the application that the user is accessing. In one example, the user may be allowed to select one of the results to generate a map related to the selected Springfield. In another example, the user may be presented with entries for "Springfield, Mass." and "Springfield, Ill." The user may continue typing characters in the character stream. When the user types in an "I" character after "Springfield" has been identified, the "Springfield, Mass." entry may be removed. The user then may select the "Springfield, Ill." entry to retrieve a map of Springfield, Ill.

FIG. 1 shows a communications system 100 that enables intelligent presentation of results related to a character stream. Generally, a client 110 exchanges communications relating to a character stream of noncompletion character with a host 130 using network 120. The host 130 analyzes the character stream to generate results related to the character stream using, for example, a database 140 (e.g., a yellow pages directory or a mapping system). The host 130 provides one or more results to the client 110, which in turn displays the results.

Generally, the client 110 includes a computing device that enables a user to exchange information over a communications network. The client 110 may include one or more devices capable of accessing content on the host 130. The client 110 also may include a controller (not shown) that processes instructions received from or generated by a software application, a program, a piece of code, a device, a computer, a computer system, or a combination thereof, which independently or collectively direct operations of the client 110. The instructions may be embodied permanently or temporarily in any type of machine, component, equipment, storage medium, or propagated signal that is capable of being delivered to the client 110 or that may reside with the controller at client 110. Client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, client 110 may include a wireless telephone running a micro-browser application on a reduced operating system with general purpose and specialized hardware capable of operating in mobile environments.

The client 110 includes one or more character stream code segments that analyze a character stream input to an information retrieval application. The character stream code segment receives the stream and structures the exchange of the character stream with other software applications on the client 110 and/or host 130. For example, the character stream code segment may wait initially wait until X initial characters are received before sending a transmission to the host 130. The character stream code segment then may send updates to the host every Y subsequent characters. Alternatively, the character stream code segment may include a delay feature set that transmits an update to the character stream if there are Z seconds of user inactivity. Thus, when X is 5 ("five") characters, Y is 2 ("two") characters, and Z is 1 ("one") second, the character stream code segment for a user who types in "DULLES GAS STAT." would request results 1) after "DULLE" 2) after "DULLES", "DULLES GA", "DULLES GAS", "DULLES GAS ST", and "DULLES GAS STAT". In the same example, if the user typed "DULLES GAS S" and paused for more than a second (when Z=1 second and the delay feature set is being used), the character stream code segment would send the "DULLES GAS S" string to the host for analysis.

The client 110 may include a preliminary analysis code segment to analyze the character stream and send periodic updates. The preliminary analysis code segment screens the character stream to enhance the efficacy of the results generated for the character stream. In one example, the preliminary analysis code segment identifies one or more databases or segments likely to be associated with the predicted interest of a consumer. Thus, when "20005" is entered, the preliminary analysis code segment may instruct an instruction in the transmission to the host 130 to poll geographic information related to zip code 20005. Other examples may include the preliminary analysis code segment identifying a service industry (e.g., plumbers), a segment (e.g., online music), or a combination of factors (e.g., plumbers in zip code 20005) as relevant to the results that are sought by the user. With the preliminary factors identified, the transmission may be sent to an appropriate database, or a query may be modified as a result of performing the preliminary analysis.

In another example, the preliminary analysis code segment also may correlate information that has been learned about a user with the character stream. If the client is believed to be operating in a particular area (e.g., based on billing information for the user), the character stream can be modified to instruct the host 130 that results should be responsive to the user's address of record. Similarly, the preliminary analysis code segment may interface with a cache or user history to better identify results for the user. Thus, if a history of user activity indicates that the user is interested in National Football League sporting events, the preliminary analysis code segment may tailor results based on the relationship of the results to American Football rather than International Football (soccer). The preliminary analysis code segment also may retrieve and display locally stored results before the host 130 is accessed.

The client 110 may include a communications code segment that interfaces with the information retrieval code segment (e.g., browser or key word tool) to modify the character stream results to reflect the network environment of the client. For example, when the client 110 includes a wireless phone with limited bandwidth, the communications code segment may structure the communications exchange to limit the amount of data in results that are returned so as not to overwhelm the network 120. This may include filtering the results so that no more than a specified number of results are returned. Similarly, the format of the results may be modified to reduce the bandwidth of results. For example, results transmitted to the client 110 may have the graphics or images removed from the application.

The client may include a display code segment that tailors the results to a display device (e.g., a monitor or a LCD ("Liquid Crystal Display")). The display code segment may manage the presentation of results so that only the most likely results are presented. The display code segment may interface with the host 130 so that the number of results does not overwhelm the memory or display capabilities of the client. In one example, the display code segment may instruct the host 130 to transmit no more than a specified number of results. In another example, the display code segment may instruct the host 130 to not return any result items larger than a specified size.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 120 may include hardware and/or software capable of enabling direct or indirect communications between the client 110 and the host 130. As such, the network 120 may include a direct link between the client 110 and the host 130, or it may include one or more networks or subnetworks between them (not shown). Each network or subnetwork may include, for example, a wired or wireless data pathway capable of carrying and receiving data. Examples of networks include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 130 is generally capable of executing instructions under the command of a host controller (not shown). The host 130 may include one or more hardware components and/or software components. An example of a host 130 is a general-purpose computer (e.g., a server or a mainframe computer) capable of responding to and executing instructions in a defined manner. Other examples include a special-purpose computer, a workstation, a PC, a device, a component, other physical or virtual equipment, or some combination thereof capable of responding to and executing instructions.

The controller is a software application loaded on the host 130 for commanding and directing communications exchanged with the client 110. Other examples include a program, a piece of code, an instruction, a device, a computer, a computer system, or a combination thereof, for independently or collectively instructing the client 110 or the host 130 to interact and operate as described. The host 130 may be embodied permanently or temporarily in any type of machine, component, physical or virtual equipment, storage medium, or propagated signal capable of providing instructions to the client 110 or the host 130.

The controller may include one or more information providing applications to support information retrieval requests sent from the client 110. The information providing applications may include a results code segment that receives a character stream from the client 110 and generates results responsive to a predicted interest by an individual user. Thus, the results code segment may generate one or more results based on the exchange of a character stream received from a client 110.

The results code segment also may receive character stream modifiers received from the preliminary analysis code segment, the communications code segment, the display code segment, and/or other code segments that modify a character stream transmission from the client. The results code segment may process the character stream in accordance with these modifiers. The host 130 also may operate code segments that perform operations similar to the feature sets in the preliminary analysis code segment, the communications code segment, and the display code segment. These host-oriented versions of these code segments may interface with the results code segment to modify the analysis performed and/or the results that are returned. For example, the host 130 may initially access a cache of content previously requested by the user. The previously-returned results may be analyzed for relevancy before additional analysis is performed or additional systems are polled.

The host 130 may interface with a database 140 to analyze the character stream. Generally, the database 140 includes storage for a volume of data and a processing engine that enables the data to be sorted, searched, and analyzed. The database may be organized along functional criteria. For example, a mapping database may be organized by geographical region, while a yellow pages database may be organized by business as well as geographic criteria. In one example, the database may be structured to perform a more detailed analysis on a character stream provided by a host 130. For example, a host 130 may receive a character stream from a client and redirect queries to one or more databases 140. Each of the redirected queries may be modified to further refine the redirected query. For example, a query redirected to a yellow pages directory may have the zip code added as a selection term. Similarly, a query directed to a database that provides stock quotes may include a reference describing which stocks are of interest to the user (e.g., stocks owned by the user).

Figure 2:
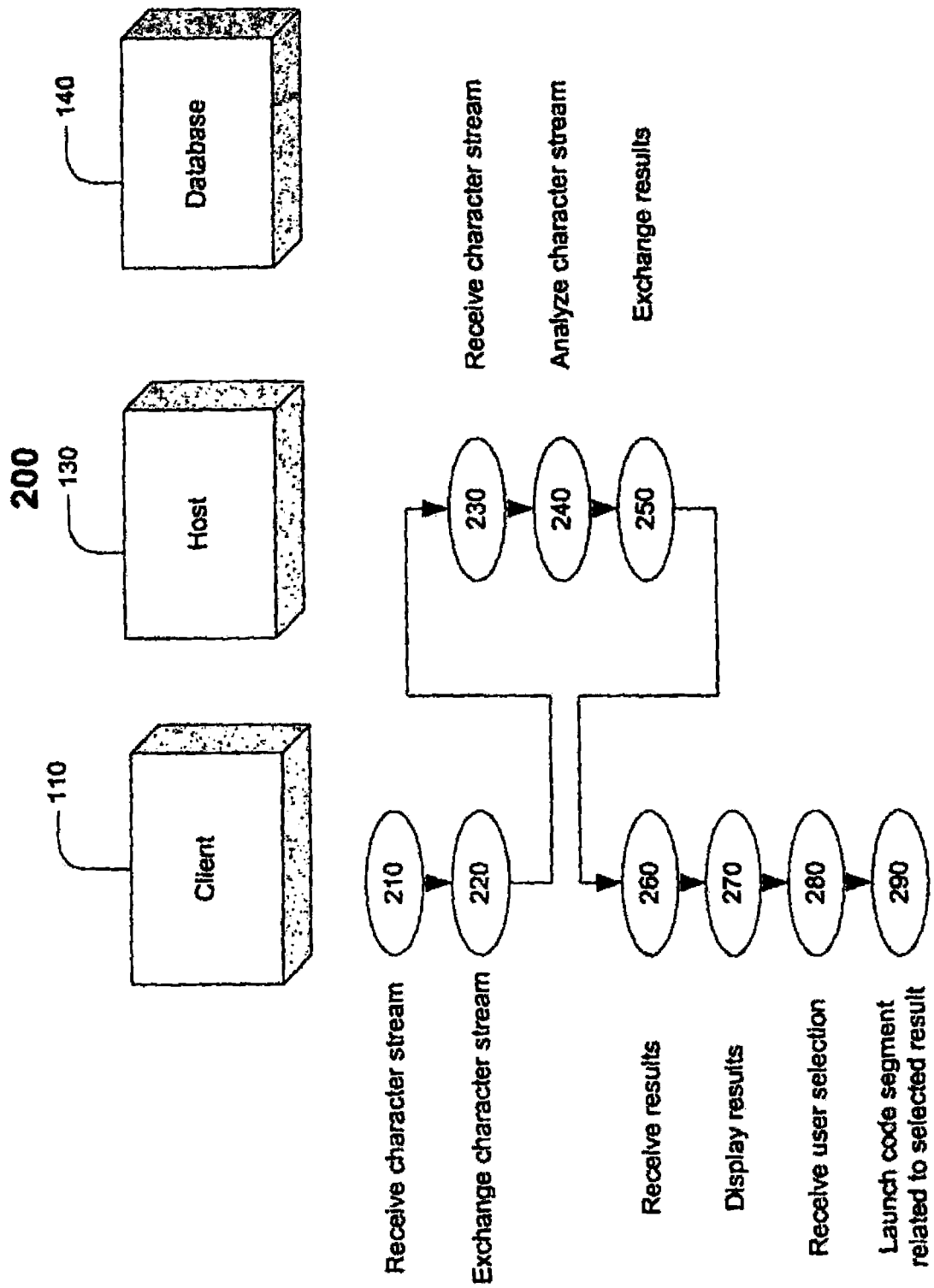
FIG. 2 is a flow chart showing how a client may use a host to intelligently present results related to a character stream.

Referring to FIG. 2, a flow chart 200 illustrates how a client 110 may use a host to intelligently present results related to a character stream of noncompletion characters. Generally, the systems in flow chart 200 relate to the systems described in FIG. 1. Flow chart 200 illustrates how the client 110 receives a character stream (step 210) and exchanges the character stream with the host (step 220). The host 130 receives the character stream (step 230), analyzes the character stream (step 240), and exchanges the results with the client 110 (step 250). The client 110 receives the results (step 260), displays the results (step 270), receives a user selection (step 280), and launches a code segment related to the selected result (step 290).

Initially, the client 110 receives a character stream of one or more noncompletion characters (step 210). Generally, receiving a character stream of one or more noncompletion characters includes receiving and organizing a user's keystrokes that are entered into a user application. For example, a user may be typing an entry into an address form for a web browser, or a key word entry field in a key word utility. Receiving the character stream may include structuring the character stream into transmissions to be exchanged with a host 130. For example, the client application may organize the transmission into a first message after a predetermined number of characters has been entered. The client application may structure additional messages to be created after a predetermined number of additional characters has been entered or a predetermined time period has elapsed between the user-entered characters. The noncompletion label indicates that the user has not indicated that the character entry process has been completed. In other words, a character stream with noncompletion characters indicates that additional characters may be received to modify the search results that are displayed in response to the predicted interest of the user. In contrast, the carriage return or "Enter" key is typically used as a completion character that enables the user to expressly generate results based on the completed character stream. Additionally, the carriage return is a completion character in that additional characters do not cause the results to be modified.

Regardless of how the transmissions between the client 110 and the host 130 are structured, the client 110 sends the character stream with the host (step 220), which receives the character stream (step 230). The host 130 then analyzes the character stream (step 240). Typically, analyzing the character stream includes relating the received character stream to one or more results that are responsive to a predicted interest by the user. In one example, the character stream may be compared with metadata labels used to describe content accessible to the host 130. For example, when the character stream includes "Nashvill", the host 130 may anticipate that "Nashvill" will eventually be completed to "Nashville, Tenn." and identify web pages that feature Nashville, Tenn. in the web page and/or are summarized by Metadata labels with "Nashville, Tenn.". However, the host 130 need not find identical character matches. For example, the host 130 may predict that a user entering "Nashvill" is predictive of an interest in country music. Accordingly, when the host 130 analyzes the results, the host 130 may also identify results related to country music, even if the results are not related to Nashville, Tenn. In another example that illustrates how the character stream may be analyzed using supplemental information, the results may be translated to include country music only when the host determines that the user is not from Tennessee.

Analyzing the character stream may include ranking the relative relevancy of results. For example, widely visited Nashville web sites (e.g., the Nashville Board of Tourism) may be scored as more relevant to a non-Nashville resident than a web site that includes a Nashville resident's personal web log ("blog"). The results may be generated in such a manner that the more relevant results are returned before the less relevant results.

With the character stream analyzed and the results identified, the host 130 exchanges results with the client 110. The results may be controlled so as to comply with the network or display constraints of the client. For example, if the network has limited bandwidth or the client has limited display capabilities, the host 130 may structure the transmission to avoid network congestion or may modify the results so as provide more suitable results (e.g., by removing images from the results that are returned).

The client 110 receives the results (step 260). The client 110 may perform additional processing to review the results to increase the efficacy of the display. For example, the client 110 may relate the returned results to a user profile and tailor the results to be displayed accordingly. In another example, the client may analyze the results to better develop the user profile and interests to increase the efficacy of subsequent character stream operations. Regardless of whether the results undergo intermediary processing, the client 110 displays the results (step 270). The results are presented in a manner that enables the user to select one of the results instead of completing their intended sequence of characters. For example, as a user types in an entry in a key word retrieval application, a drop down window may appear in the key word retrieval application with one or more likely results. As the user continues typing, the results appearing in the drop down window may be tailored to reflect the latest analysis of the character stream. When the user sees a result of interest, the user may select the result (step 280). Selection of a result causes the application to launch a code segment related to the selected result (step 290). For example, when the user selects a result describing a map of an area, a web browser accessing a mapping web site may be launched to display a map related to the inputted character stream.

Figure 3:
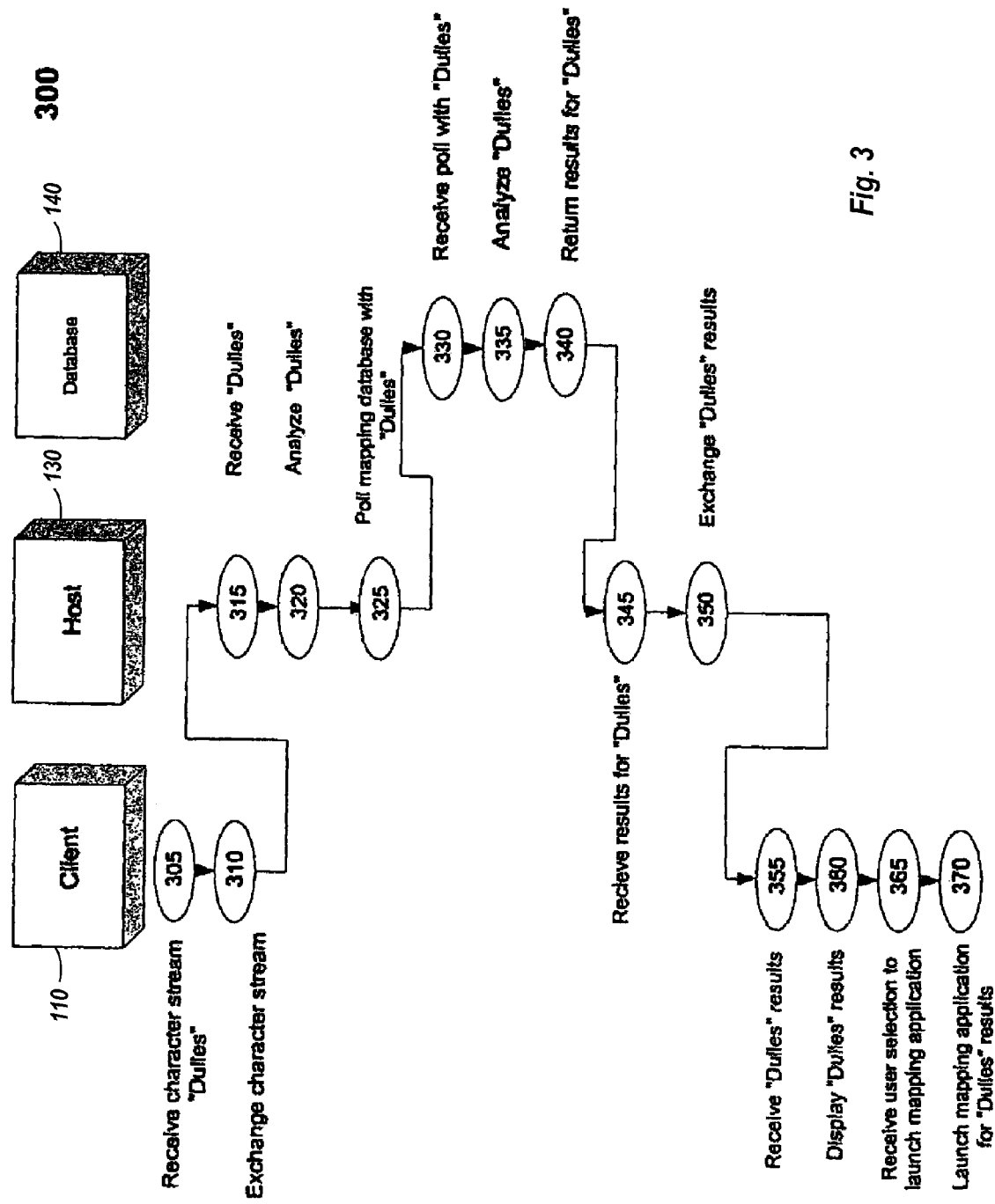
FIG. 3 is a flow chart showing how a client exchanges a character stream with a host and receives mapping information related to the character stream.

FIG. 3 shows a flow chart 300 illustrating how a client 110 exchanges a character stream with a host 130 to retrieve mapping information residing on a database 140. Generally, the systems and operations described in FIG. 3 relate to the systems and operations described previously with respect to FIGS. 1 and 2. However, FIG. 3 illustrates how the host 130 may interface with the database 140 to retrieve results for the client 110. The client 110 exchanges the character stream with the host 130. The host, in turn, uses the database 140 in its analysis of the character stream to produce results. The host provides the results to the client 110, which, in turn, presents the results and launches the appropriate code segment when the user selects the result of interest.

Initially, the user of client 110 enters the character stream "Dulles" (step 305). The client exchanges the character stream with the host 130 (step 310), which receives the character stream "Dulles" (step 315). The host 130 analyzes the character stream "Dulles" (step 320). The host 130 may perform a local analysis of a character stream to compare the character stream against popular results that are cached on the host 130, while distributing customized queries to specialized databases to identify results of greater relevance. For example, in flow chart 300, analyzing the character stream includes polling a mapping database related to "Dulles" (step 325). Although flow chart 300 depicts one database 140 being accessed, multiple databases may be polled. Examples of other databases that may be polled include, but are not limited to, messaging databases, directory services, yellow pages, and financial databases.

The database 140 receives the poll with "Dulles" (step 330). "Dulles" is then analyzed (step 335), and results are retrieved. For example, multiple maps related to Dulles, Va., could be identified and/or retrieved. This may include a map of Dulles Township, directions to Dulles International Airport, and directions to various corporate offices located in Dulles, Va. The results are then returned to the host 130 (step 340).

Upon receiving the results (step 345), the host 130 exchanges the "Dulles" results with the client (step 350). Exchanging the results with the client may include synchronizing results received from multiple databases and identifying the results of the greatest relevance. For example, multiple databases may be polled to analyze the character stream. The overall number of results returned from the client 110 may be too large for the client 110 to process and/or display. Accordingly, the host 130 may filter and identify only those results relevant to the host. In one example, the most relevant results are returned to the client 110, while the pool of results remains available for analysis in light of subsequently received characters in the character stream. In another example, the results from the databases are received at different times. For example, a query that precisely develops and then matches a user demographic may take longer than a query that compares the results against the most commonly retrieved results. Exchanging the results may include initially presenting the most commonly retrieved results and then subsequently presenting the results of the longer query when the results of the longer query become available.

The client receives the "Dulles" results (step 355) and displays them (step 360). As shown, when the client 110 receives a user selection to launch a mapping application related to "Dulles" (step 365), the client 110 launches a mapping application for the selected "Dulles" results (step 370).

Figure 4:
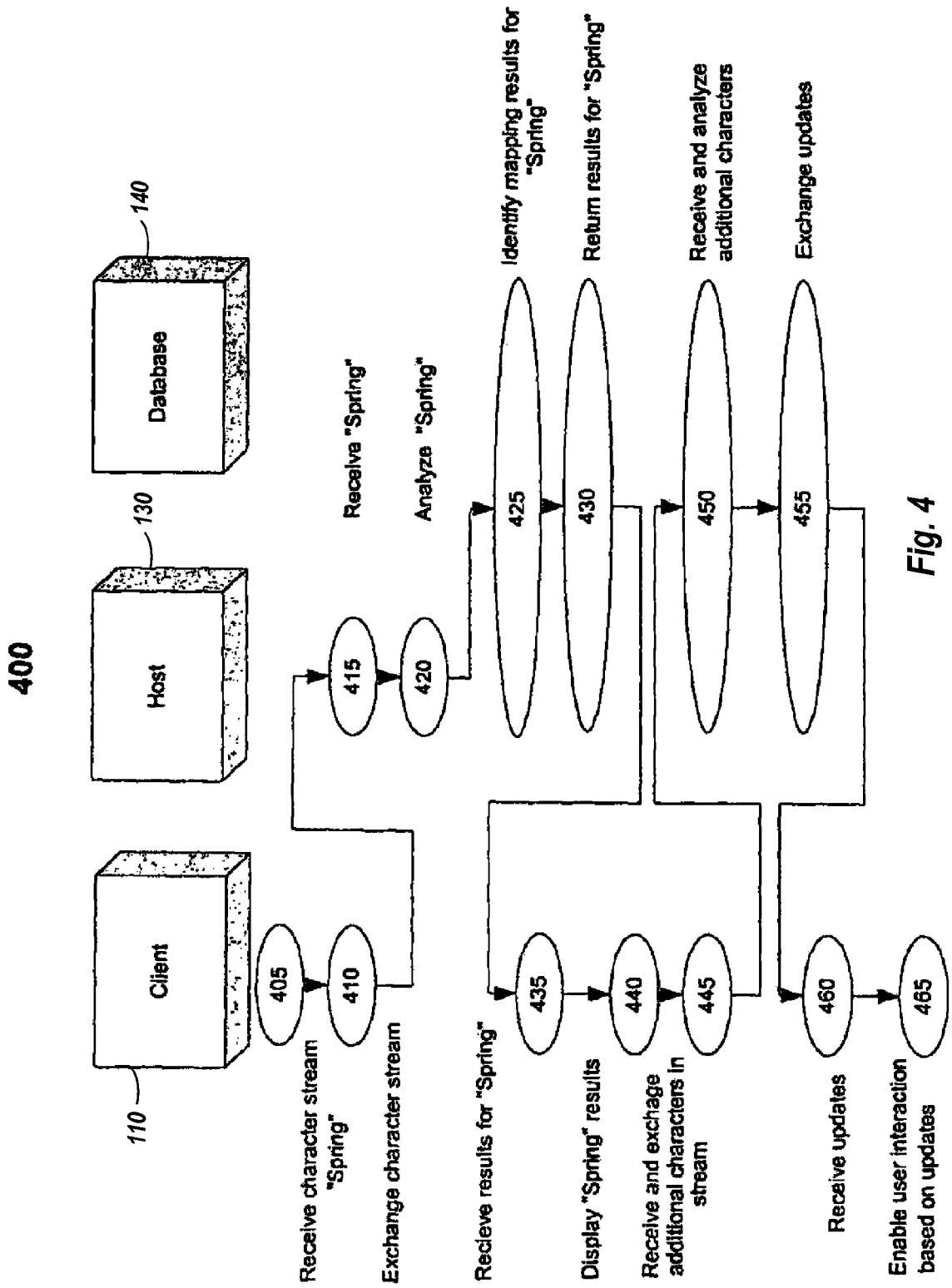
FIG. 4 is a flow chart showing how the client display may be modified based on updates to the character stream.

FIG. 4 illustrates a flow chart 400 showing how the client display may be modified based on updates to the character stream. Generally, the systems and operations shown in FIG. 4 relate to the systems and operations described previously with respect to FIGS. 1-3. However, flow chart 400 illustrates how updates to the character stream may generate different results with which the user may interact. In particular, subsequently received characters in the character stream may generate a different set of results for display by the client. In this manner, the user may modify the character stream and observe in real-time new results based on the modifications.

Initially, the client receives the character stream "Spring" (step 405), and exchanges the character stream 410 with the host 130 (step 410). The host 130 receives the character stream "Spring" (step 415) and analyzes the character stream "Spring" (step 420). The host 130 and/or the database 140 identifies mapping results for the character stream "Spring" (step 425), and returns these results to the client 110 (step 430). The client receives the results related to "Spring" (step 435) and displays them (step 440).

The client then receives and exchanges additional characters in the character stream (step 445). For example, although the string "Spring" may likely identify information related to the several cities of Springfield, the user may enter additional information to confirm that Springfield is what the user has in mind and to identify the Springfield of interest to the user. Thus, the user may enter a field "I" as the next characters to express interest in Springfield, Ill. The host 130 and/or the database 140 receives and analyzes the additional characters (step 450). The host 130 and/or the database 140 generates a new set of results related to the update, which is exchanged with the client 110 (step 455). In the example using Springfield, Ill., mapping and yellow page information related to the town of Springfield, Ill. may be exchanged.

The client 110 receives the updates (step 460) and enables the user interaction based on the updates (step 465). For example, a list of maps, services, and other information related to Springfield, Ill. may be displayed.

Figure 5:
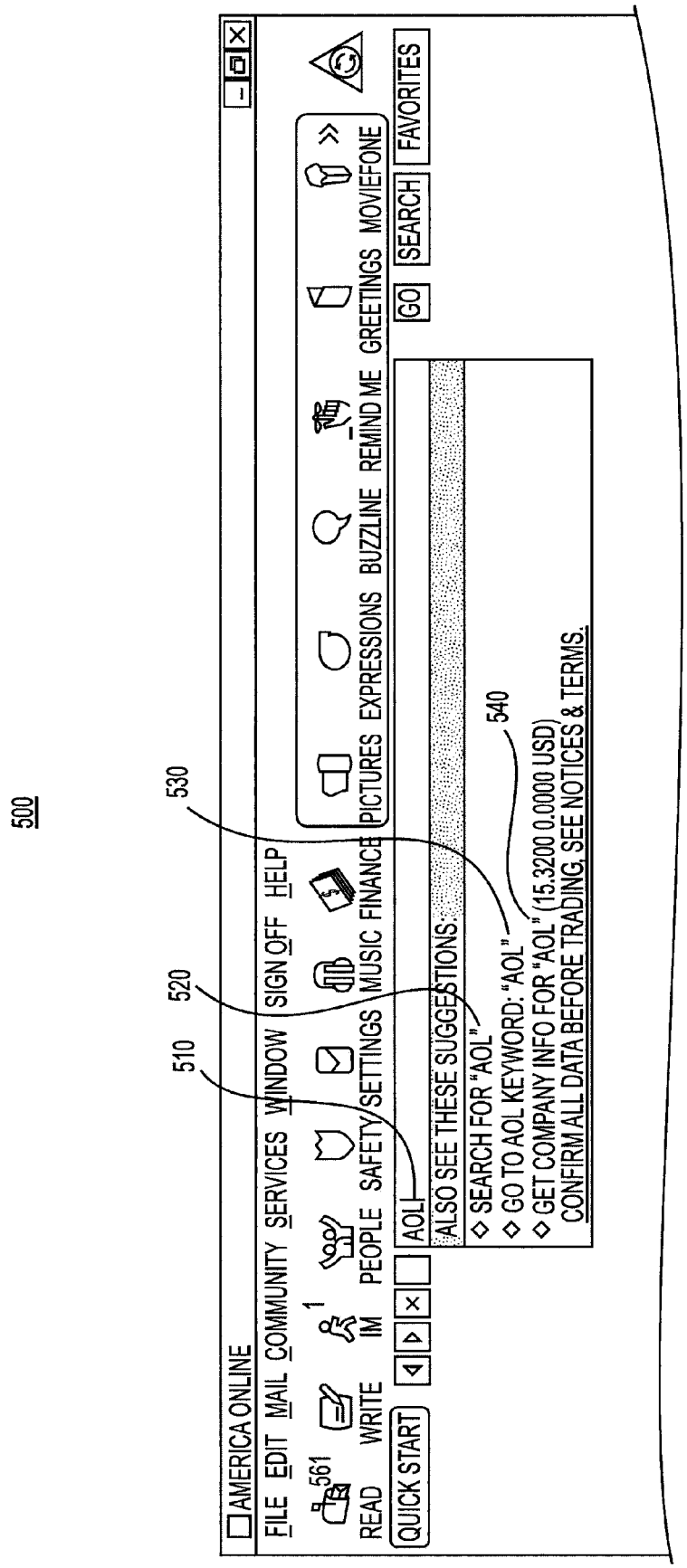
FIGS. 5-10 are exemplary graphical user interfaces (GUIs) illustrating how real-time results related to a character stream may be presented.

Referring to FIG. 5, exemplary results related to a character stream with noncompletion characters are shown in GUI 500. Generally, GUI 500 may be displayed on a client 110 that was primarily described with respect to FIG. 1 using the operations described with respect to FIGS. 2-4. GUI 500 illustrates code segments that may be invoked in a results page as a character stream is entered in a user application such as a web browser. Specifically, text entry field 510 has received the character stream "aol" without a carriage return as is indicated by the cursor "|". GUI 500 includes a result 520 that enables a search to be launched for the string "aol", a result 530 that enables a code segment to be launched for the AOL Keyword "aol", and a result 540 that enables a code segment that retrieves a stock quote for "AOL", which is shown trading at 15.32 US Dollars on a stock market exchange.

Figure 6:
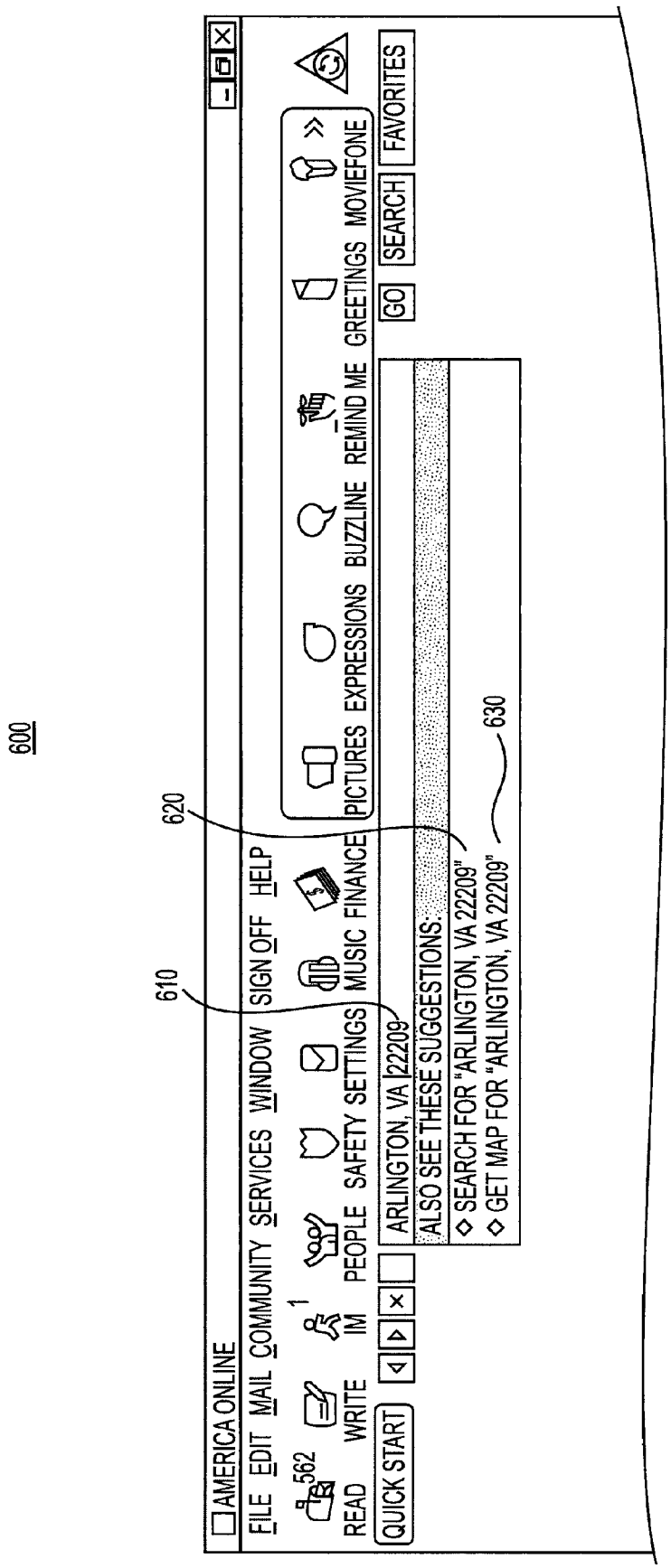

Referring to FIG. 6, exemplary results for the character stream "Arlington, Va. 22209" are shown in GUI 600. Generally, GUI 600 relates to systems, operations, and displays described previously with respect to FIGS. 1-5. However, GUI 600 illustrates the different databases and/or applications that may be accessed from a user application. For example, when "Arlington, Va. 22209" is inserted in text entry field 610, a searching code segment can be launched using result 620 and a mapping code segment can be launched using a result 630.

In one example, the displays related to results 620 and 630 have already been retrieved by the client 110. Alternatively, content in the displays related to results 620 and 630 may need to be downloaded (e.g., from the host 130 and/or the databases 140).

Figure 7:
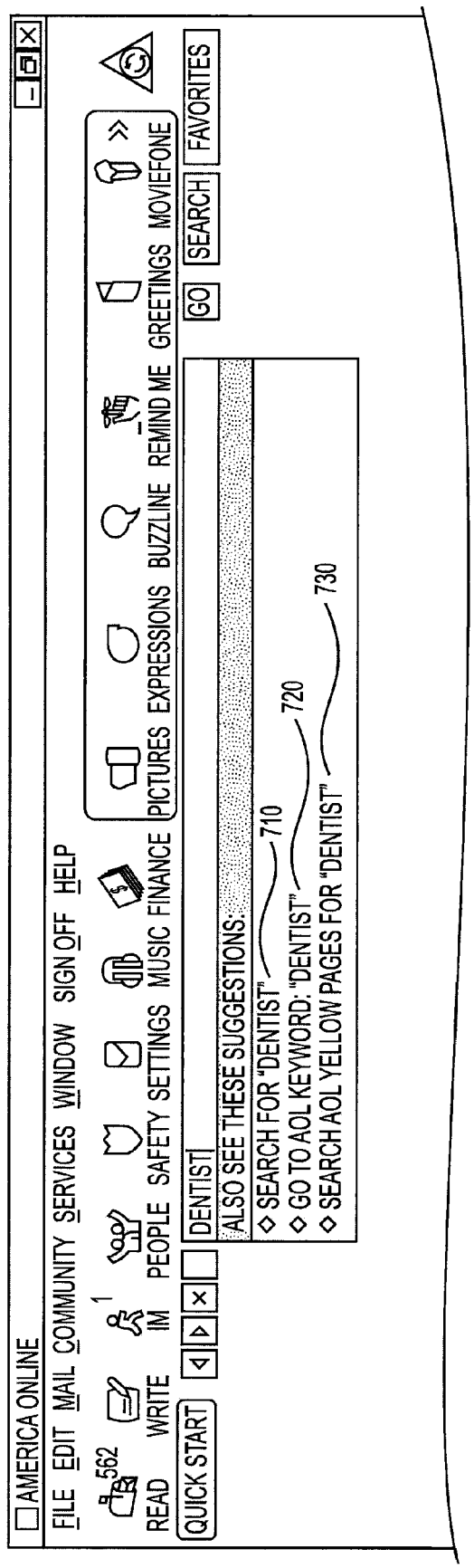

FIG. 7 illustrates a GUI 700 that is related to the character stream "dentist". Generally, GUI 700 relates to the systems, operations, and displays described previously with respect to FIGS. 1-6. However, GUI 700 illustrates how the character stream can be analyzed to identify a yellow page entry related to the character stream.

GUI 700 includes result 710 enabling the user to launch a code segment to search on the character stream "dentist". Note that, although in GUI 700 the character stream includes the complete text for dentist, shorter strings, such as "dentis" or "denti" also may be analyzed and used to generate a result that launches a search on the character strings "denti" or "dentist". Result 720 enables the user to launch a code segment so that the client can "Go to" the AOL keyword "Dentist".

Result 730 enables the user to launch a code segment to search the AOL Yellow Pages for "Dentist". Note that, although result 730 features a result to launch a search of the yellow pages for "dentist", other GUIs may include a list of available dentists. For example, if the user's location is known, a list of dentists in the user's zip code may be presented, with the dentists sorted and presented by specialties. A result from the GUI may be selected to launch the dentist's web page, launch a messaging application to exchange communications with the dentist, or launch a calendaring application to create a dentist appointment.

Figure 8:
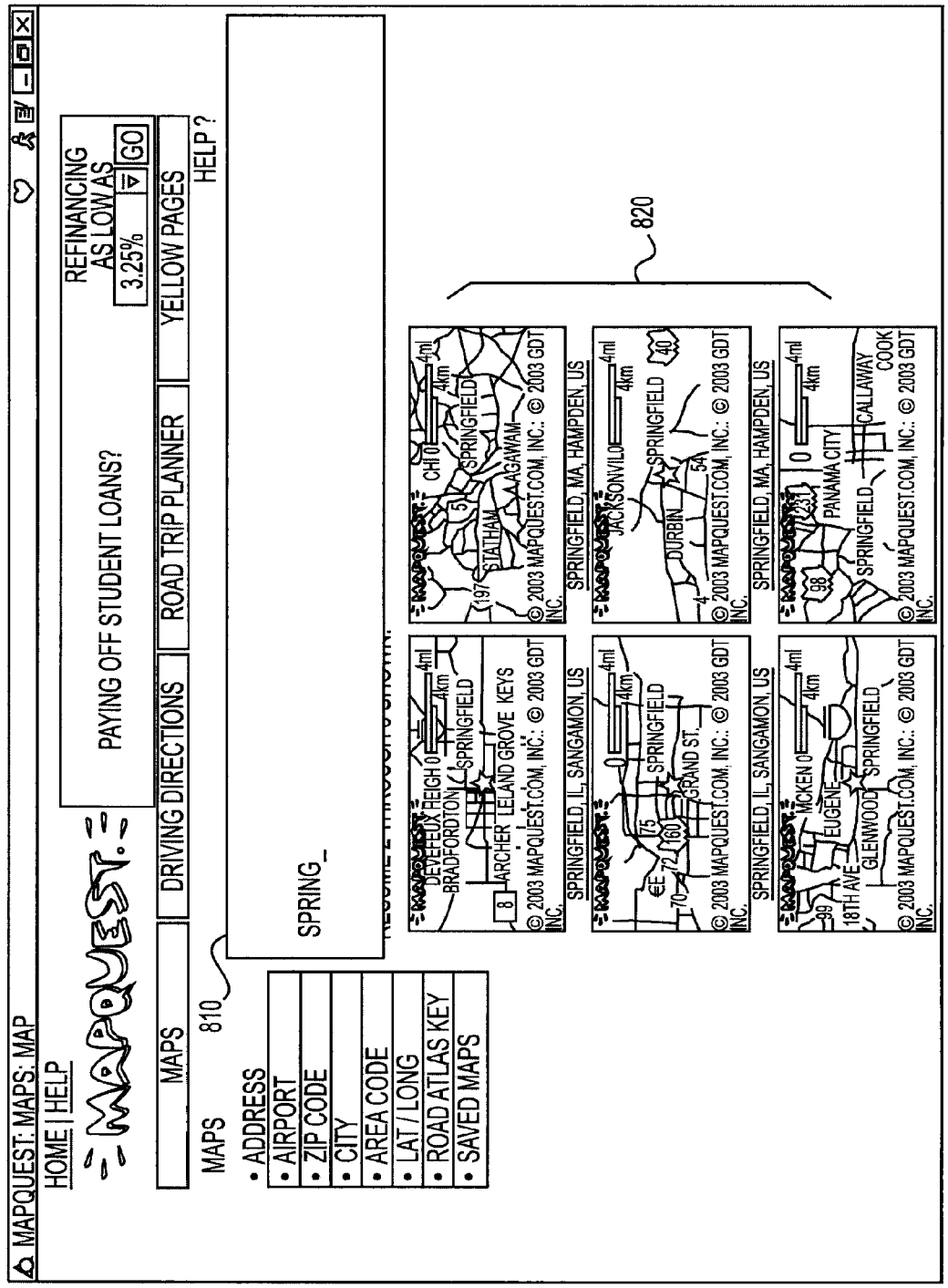
Figure 9:
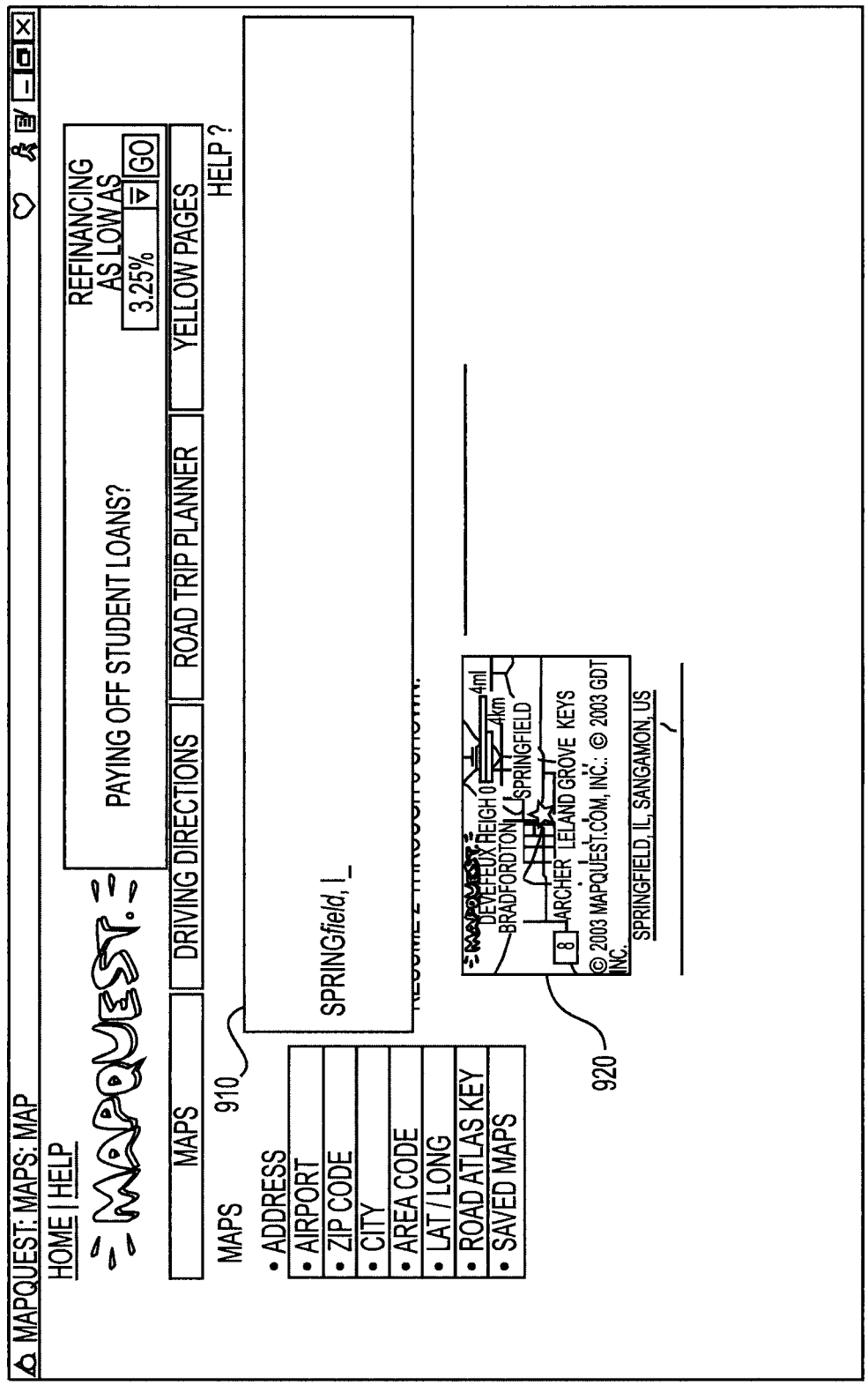

Referring to FIGS. 8 and 9, GUIs 800 and 900 illustrate how the displayed results may be altered as additional characters in the character stream are received. Generally, GUIs 800 and 900 relate to the systems, operations, and displays described previously with respect to FIGS. 1-7. However, GUIs 800 and 900 differ from the previous displays in that the results are not displayed in a drop down window as appeared in FIGS. 5-7. Also, GUIs 800 and 800 illustrate how results may be generated and displayed using a portion of the intended character stream and also how updates to the character stream need not follow the preceding character stream to precisely form the string of interest. GUI 800 shows the multiple results 820 that are available after "Spring" has been inputted into the text entry field 810. GUI 900 indicates that after an "I" is subsequently entered in text entry field 910, the results may be filtered so that only the results 920 "Springfield, Ill." are displayed. Note that none of the intervening characters (e.g., the "field," in Springfield, Ill.) were included in the character stream.

Although GUIs 800 and 900 indicate that a mapping resource is being accessed, the operations described for FIGS. 8 and 9 are applicable in other applications and environments. Because the user entered the character stream within a mapping application, the results may be tailored to seek map results. This may be performed by searching a mapping database, or by polling a host 130 with a modifier indicating that mapping results should be retrieved. Although GUIs 800 and 900 do not require or allow the user to specify a mapping requirement or restriction, other GUIs may allow the user to specify the databases that are used to analyze the character stream (not shown).

Figure 10:
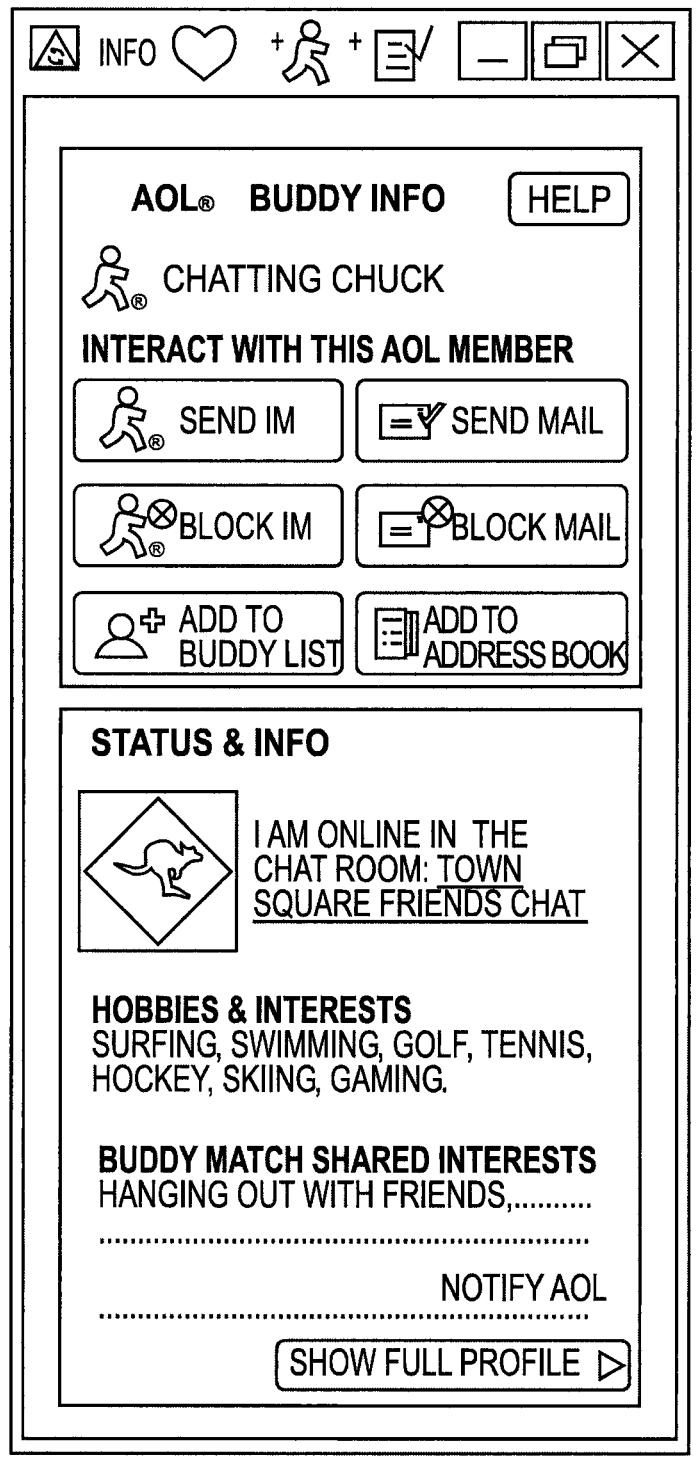

Referring to FIG. 10, GUI 1000 is an exemplary messaging display that enables a user to exchange messaging communications. Generally, GUI 1000 relates to the systems and profiles described previously with respect to FIGS. 1-9. However, GUI 1000 illustrates the messaging results that can be displayed when the character stream relates to messaging information. For example, when a user types in "chattingchuck" in a text entry field (not shown), GUI 1000 may be displayed, enabling the user to send mail, send an instant message, add "chattingchuck" to an address book, block mail and instant messages from "chattingchuck", and/or view the status or interests for "chattingchuck". Although FIG. 10 illustrates the messaging applications or operations related to one user named "chattingchuck", results related to more than one user may be displayed. Similarly, when the user enters an "@" character (the AT character associated with Internet Mail systems), options not related to electronic mail messaging may be removed.

Other implementations are in the scope of the following claims. For example, although the operations described examples of retrieving results that relate to a character stream, the results need not include the information that will ultimately be displayed upon launching a code segment. Rather, the results may include a label that describes the results that may be subsequently retrieved if accepted.

Similarly, the client and host applications may include assistants and spelling correction agents to increase the efficacy of retrieved results. Assistants may help the user by retrieving similar results related to the predicted character stream's meaning. For example, if the character stream includes "German automobiles," results that include prominent manufacturers of German automobiles, including Mercedes, BMW, and Audi, may be retrieved. Spelling correction agents may recognize that the user has likely entered a typographical mistake. In response, the spelling correction agents may correct the character stream by altering the entered character stream on the desktop and/or by retrieving results related to the predicted entry.

Similar to the spelling correction agent, the system may include a validation agent that may be used to validate a URL ("Uniform Resource Locator") entered in the character stream. For example, when the user enters the address for a web site, the web site address may be analyzed to determine if the device and file information actually exists and/or is correct. When the URL information is incorrect, the system may resolve the character stream to identify the correct or related URL address.

The client 110 may be used to intelligently present results related to media communications such as streaming audio and video communications. For example, a content provider or a service provider may be distributing a large number of "channels" or bands of discrete presentations. A user may wish to survey the channels to find channels presenting information most relevant to the user's interests. Accordingly, the user may enter a character stream relating to content the user finds of interest. For audio content, the character stream may relate to an artist, album, or selection (e.g., song) name. For video content, the character stream may relate to a particular news affiliation (e.g., TIME or CNN), show, episode, or subject matter. In any event, regardless of the underlying content, the character stream may be used to retrieve results related to the user's interests as expressed in the character stream. This may be performed by comparing the entered character stream with metadata or subtitles associated with a particular media selection. In one instance, the character stream may be compared with the subtitles for available programming to identify results for the user. Thus, when the user enters the name in a character stream of a newsmaker, the subtitles of all available programming (including on-demand and broadcast streams) may be searched to identify media streams featuring the newsmaker.

The resultant media streams may be presented in a variety of formats. In one example, a drop down menu appears to enable the user to launch a media application related to the retrieved results. In another example, when the media streams include video streams, a tile of video streams similar to the tiled orientation in FIG. 8 may be displayed. The video stream tiles may include reduced bit rate presentations to provide the user with a brief indication of the video content available. When a user selects one of the video tiles, an instance of the video selection at a greater bit rate may be presented.

The systems and operations may be modified to operate in an Intranet or trusted environment. For example, rather than searching public databases, the system may be configured to incorporate security procedures and practices associated with a trusted environment. Thus, a sales employee may be allowed to access customer and marketing databases in analyzing the character stream. Engineering personnel may be allowed to review technical and operational support databases to support their mission, but may be precluded from analyzing the character stream using a sales database. Management and/or investigatory personnel may be allowed to access most or all databases in analyzing a character stream.

The results may be stored on the client 110 and/or the host 130. For example, the host 130 may cache previously returned results that may be used when analyzing subsequent character streams. In another example, previously selected results may be stored on the client and subsequent character streams may initially be accessed using the previously-stored results.

The client 110 may enable the user application to launch a messaging code segment. Alternatively, the user may be entering the character stream in a messaging application. For example, the user may be entering a character stream in an instant messaging application. The instant messaging application may transmit the character stream to a host 130 for analysis. The client 110 may receive the results and enable the client to transmit an instant message when the results indicate that an identified user is online.

Exchanging the updates may include exchanging only the portion of the character stream that has changed since the character stream was last exchanged. For example, as a user initially types in information into a first application, the first application may send a message to the host 130 with the initially entered character stream (e.g., "Spring"). As the user enters updates to the character stream (e.g., by typing "field" after "Spring"), the client 110 may send the new information without sending the old information (e.g., the client 110 subsequently sends "field" instead of "Springfield"). Alternatively, the client 110 may send the current character stream. For example, the client 110 may first send "Spring" and then later transmit "Springfield".

The client 110 and/or host 130 may determine that there are no relevant results and operate to preclude additional processing resources from being used. For example, the user may be entering character streams for which the host 130 has no information and generates no results. When the host 130 determines that there is no information, the host 130 may interface with the client 110 to prevent additional updates from being exchanged. Such a condition occurs when the user enters a character stream that does not relate to content accessible by the host 130. For example, the host 130 may determine that CHARACTERSTREAM1 will not yield any results, and no extension of CHARACTERSTREAM1 will yield any results. If the user enters additional information, such as CHARACTERSTREAM123, the first application will not send any updated information to the host 130. However, if the user uses the DELETE key to modify the character stream so that CHARACTERSTREAM1 is changed to CHARACTERSTREAM, the character stream may be exchanged.

The client 110 may perform preliminary analysis to preclude common character streams from being analyzed where the common character stream generates results that are not responsive to the predicted interest of a user. For example, when "the" appears in a character stream, particularly in an initial portion of the character stream, generating results using the character stream "the" likely generates too many results, few, if any, of which are responsive to the predicted interest of the user. Accordingly, exchanging the character stream may be delayed until the character stream is meaningful. Thus, exchanging the character stream "the" may be delayed until character stream reads "the Greek islands" or another character stream likely to generate meaningful results. Similarly, the character stream may be restructured to remove strings in the character stream not likely to assist in the analysis (either on the client 110 or the host 130). Thus, strings appearing in the character stream such as "the", "a", and "this" may be removed from the character stream prior to exchanging the character stream.

Displaying the results may include displaying the results directly in addition to displaying a label for the results that enables a code segment for the results to be launched. For example, the results may include an actual stock quote rather than a label for a code segment that generates a stock quote. The displayed result may include a capsule or brief summary for a news item. The capsule also may be configured to retrieve a more detailed article on the news item when the user selects the news item.

Other examples of results that may be retrieved may include, but are not limited to, phone numbers and/or keywords. Clicking on a result with a phone number may allow an Internet phone call to be placed. The phone call may be bridged to a telephone network or connected to an IP phone (e.g., a virtual phone application residing in a dialed user's PC).

The results and additional information descriptive of results previously returned or selected may be stored on the client 110 and/or the host 130. For example, the most recently accessed results may be cached on the client 110, while a more extensive history of results may be cached on the host 130. The stored results may be accessed and used to analyze and generate results responsive to a user's predictive interest.

To illustrate how stored results may be used to analyze a subsequent character stream, a previous search related to the National Football League (NFL) may generate a series of metadata tags. These metadata tags may be stored in a profile associated with the user. For example, the user searching for NFL-related information may have the metadata tags "NFL", and "Football" added to their user profile. The metadata tags may be used in performing subsequent analysis. Thus, when the user types in "Falcons", additional metadata tags related to the multiple meanings of "Falcons" may be generated and analyzed using the metadata tags previously generated. Examples of metadata tags related to Falcons may include terms such as "NFL", "Audubon Society", and "Sport of Kings". The metadata tags from the previous search on the NFL may be compared against metadata tags generated by entering "Falcons". By correlating the results from a previous search with known metadata tags for the term of interest, results that are likely to be more responsive to the predicted interest of a user are returned. In this case, correlating the results of the previous search with the present search generates results related to the NFL's Atlanta Falcons.

The results from multiple users may be used to determine results that are more responsive to a predictive interest of a different user. For example, if most of the users entering "Falcons" as a character stream are determined to be interested in the NFL, a default rule may be created and adopted that returns results related to the NFL sports team in response to "Falcons." A finer analysis may be performed by suspending the default rule when the user has a profile or has expressed an interest in other, non-sports aspects of "falcons" or used modifiers such as "birds", "Audubon Society", or "kestrels".

Other implementations are within the scope of the following claims.

What is claimed is:

1. A method comprising:
receiving a character stream of non-completion characters input by a user;
performing, using at least one processor, a spelling analysis of the character stream;
modifying the character stream based on the analysis to form a modified character stream;
performing a search using the modified character stream; and
providing one or more results of the search prior to input of a completion character by the user.

2. The method as recited in claim 1, wherein performing a spelling analysis of the character stream comprises identifying a typographical mistake.

3. The method as recited in claim 1, further comprising displaying the modified character stream to the user prior to display of the one or more results of the search.

4. The method as recited in claim 1, further comprising receiving the character stream of non-completion characters in an address line of a web browser installed on a client computing device.

5. The method as recited in claim 1, further comprising receiving the character stream of non-completion characters in a text entry field of a web page loaded by a web browser installed on a client computing device.

6. The method as recited in claim 1, wherein the completion character is a carriage return.

7. The method as recited in claim 1, wherein:
the character stream of non-completion characters is received from a client computing device at which they were input by the user; and
providing one or more results of the search comprises sending the results of the search to the client computing device.

8. The method as recited in claim 7, wherein the client computing device is a mobile device.

9. The method as recited in claim 8, wherein the mobile device is a wireless phone.

10. The method as recited in claim 1, wherein modifying the character stream comprises replacing the character stream with an alternative character stream of non-completion characters identified based on the analysis.

11. A system comprising at least one processor and a non-transitory computer-readable storage medium including a set of instructions that, when executed by the least one processor, cause the system to perform steps comprising:
receiving a character stream of non-completion characters input by a user;
performing a spelling analysis of the character stream;
modifying the character stream based on the analysis;
initiating a search using the modified character stream; and
providing one or more results of the search prior to input of a completion character by the user.

12. The system as recited in claim 11, wherein performing a spelling analysis of the character stream comprises identifying a typographical mistake.

13. The system as recited in claim 12, further comprising instructions that, when executed by the at least one processor, cause the system to perform the step of displaying the modified character stream to the user prior to display of the one or more results of the search.

14. The system as recited in claim 13, wherein the character stream of non-completion characters is received in an address line of a web browser installed on a client computing device.

15. The system as recited in claim 14, wherein the completion character is a carriage return.

16. The system as recited in claim 11, wherein the character stream of non-completion characters is received from a client computing device at which they were input by the user, and wherein providing one or more results of the search comprises sending the results of the search to the client computing device.

17. The system as recited in claim 16, wherein the client computing device is a mobile device.

18. The system as recited in claim 17, wherein the mobile device is a wireless phone.

19. The system as recited in claim 11, wherein modifying the character stream comprises replacing the character stream with an alternative character stream of non-completion characters identified based on the analysis.

20. The system as recited in claim 11, wherein the character stream of non-completion characters is received in a text entry field of a web page loaded by a web browser installed on a client computing device.

* * * * *